United States Patent [19]

Saigo et al.

[11] Patent Number: 5,485,399
[45] Date of Patent: Jan. 16, 1996

[54] SPECTACLE LENS SUPPLY METHOD

[75] Inventors: Tsuyoshi Saigo; Takeo Koseki, both of Hamura; Yoshihiro Kikuchi, Akikawa; Takashi Hatanaka, Higashimurayama, all of Japan

[73] Assignee: Hoya Corporation, Tokyo, Japan

[21] Appl. No.: 80,210

[22] Filed: Jun. 23, 1993

[30] Foreign Application Priority Data

Jun. 24, 1992 [JP] Japan ..................................... 4-165912
Aug. 7, 1992 [JP] Japan ..................................... 4-211645

[51] Int. Cl.⁶ ............................................... G02C 13/00
[52] U.S. Cl. ........................... 364/525; 351/178; 395/161
[58] Field of Search .............................. 364/525, 413.01, 364/474.01, 474.06, 578, 550, 551.01; 351/200, 41, 107, 177, 178; 395/50, 100, 161, 920, 924

[56] References Cited

U.S. PATENT DOCUMENTS

| | | | |
|---|---|---|---|
| 4,055,900 | 11/1977 | Grolman et al. | 33/200 |
| 4,405,212 | 9/1983 | Cooper | 351/43 |
| 4,573,121 | 2/1986 | Saigo et al. | 364/413.01 |
| 4,656,590 | 4/1987 | Ace | 364/474.06 |
| 4,958,280 | 9/1990 | Pauly et al | 364/403 |
| 5,117,354 | 5/1992 | Long et al. | 364/401 |

FOREIGN PATENT DOCUMENTS

| | | |
|---|---|---|
| 0092364 | 10/1983 | European Pat. Off. . |
| 0299690 | 1/1989 | European Pat. Off. . |
| 0363281 | 4/1990 | European Pat. Off. . |

*Primary Examiner*—Emanuel T. Voeltz
*Assistant Examiner*—Edward Pipala
*Attorney, Agent, or Firm*—Armstrong, Westerman, Hattori, McLeland & Naughton

[57] ABSTRACT

A spectacle lens supply method for a system which includes a terminal installed at a lens orderer side and at least a computing device installed at a lens processor side and connected to the terminal via a communication line, for supplying spectacle lenses. In the lens supply method, the terminal transmits processing condition data including at least one of lens information, frame information, prescription values, layout information and processing information to the computing device, and the computing device calculates a desired lens shape including a bevel figure based on the received processing condition data, creates accept/reject information as to whether a lens process including beveling is possible or not, based on the result of the calculation, and transmits the accept/reject information to the terminal, which information is displayed at the terminal to permit the lens orderer to learn whether the lens process including beveling is possible or not.

19 Claims, 29 Drawing Sheets

60 — INQUIRY

| 10 | ORDERER (077801) | DELIVER TO: (077801) | METHOD OF DELIVERY ( ) |
|---|---|---|---|
| 20 | D ITEM ( ) | FORM (4) HELP | METS PROCESS (3) UNSPECIFIED |

65

61 — LENS (MV3-H ) LENS L ( )
  (MV3X-H : (
  Sph  Cyl  Ax  Add          PROCESS 1  PROCESS 2  PROCESS 3  PROCESS 4
41  R (-2.00) (-1.50) (120) (1.00)    (    )(    )(    )(    )
42  L (-2.00) (-1.50) ( 45) (1.00)    (    )(    )(    )(    )

62

MAKER  ARTICLE NO.  SIZE      COLOR  TMP FRAME   COLOR    TYPE/1  /2
                                      PATTERN STREAM
51  FRAME (USER   010      ( - ) USERTEST  0000      METAL
52  :  (

63

PD   NPD  SEG  ET  EP   BEVELING MODE    POSITION         SHAPE
61  R (33.0)(    )(    )(    )(    )  (4) AUTO      (0.0) mm      (0) SPECIFIED
62  L (33.0)(    )(    )(    )(    )  (4) AUTO      (0.0) mm      (0) SPECIFIED

64

70  SPECIAL NOTE (HELP                    ) NAME (HOYA           )
80  CORRECT / DELETE NO. ( )  (CORRECTION : NO [1], DELETION : NO [2] )

66 SOFT KEY MENU
66a TRANSMIT | 66b REGISTER | 66c ORDER C | 66d CLEAR | 66e PAGE | 66f END

FIG. 6

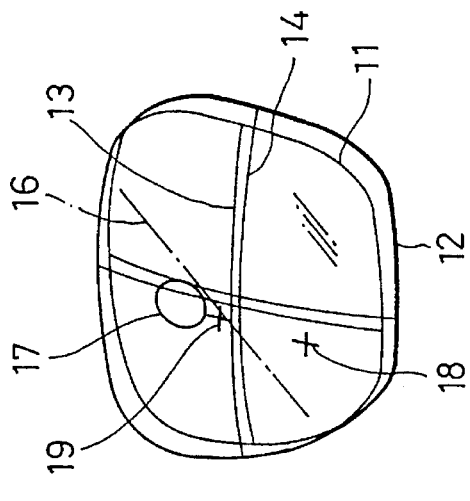
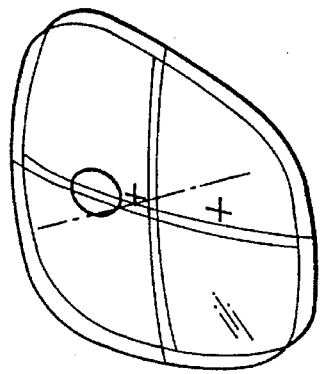
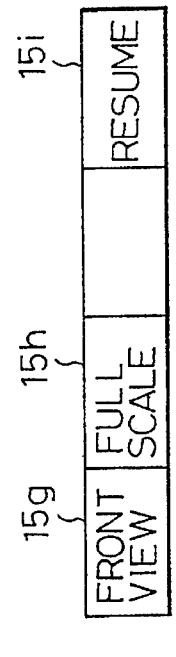
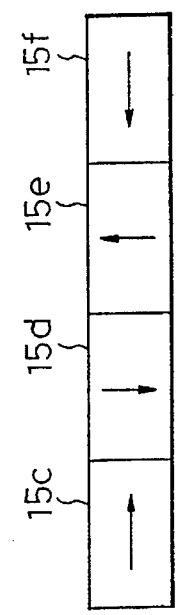
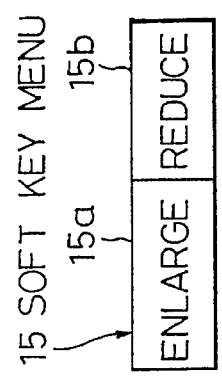
FIG. 10

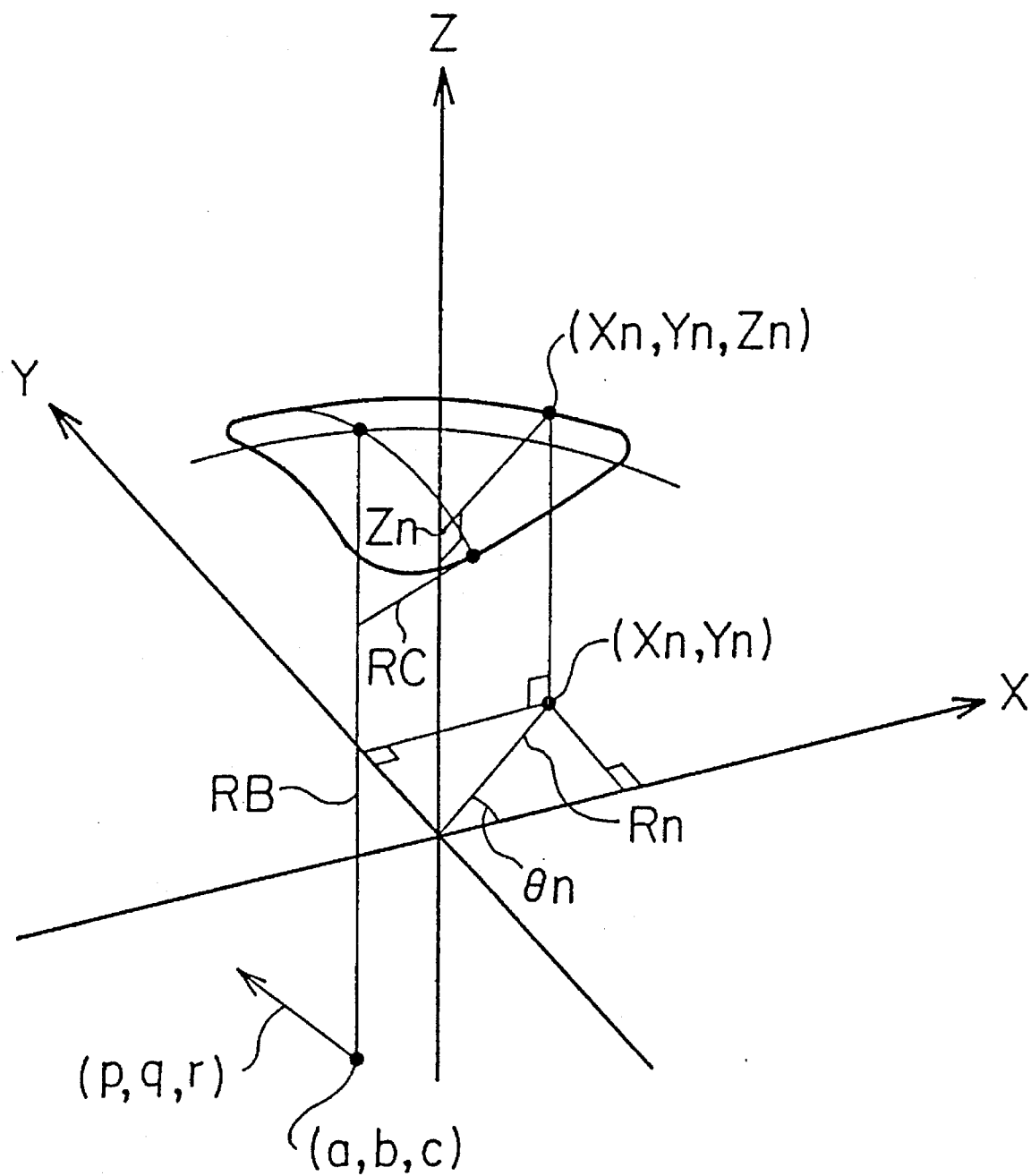
F I G. 15

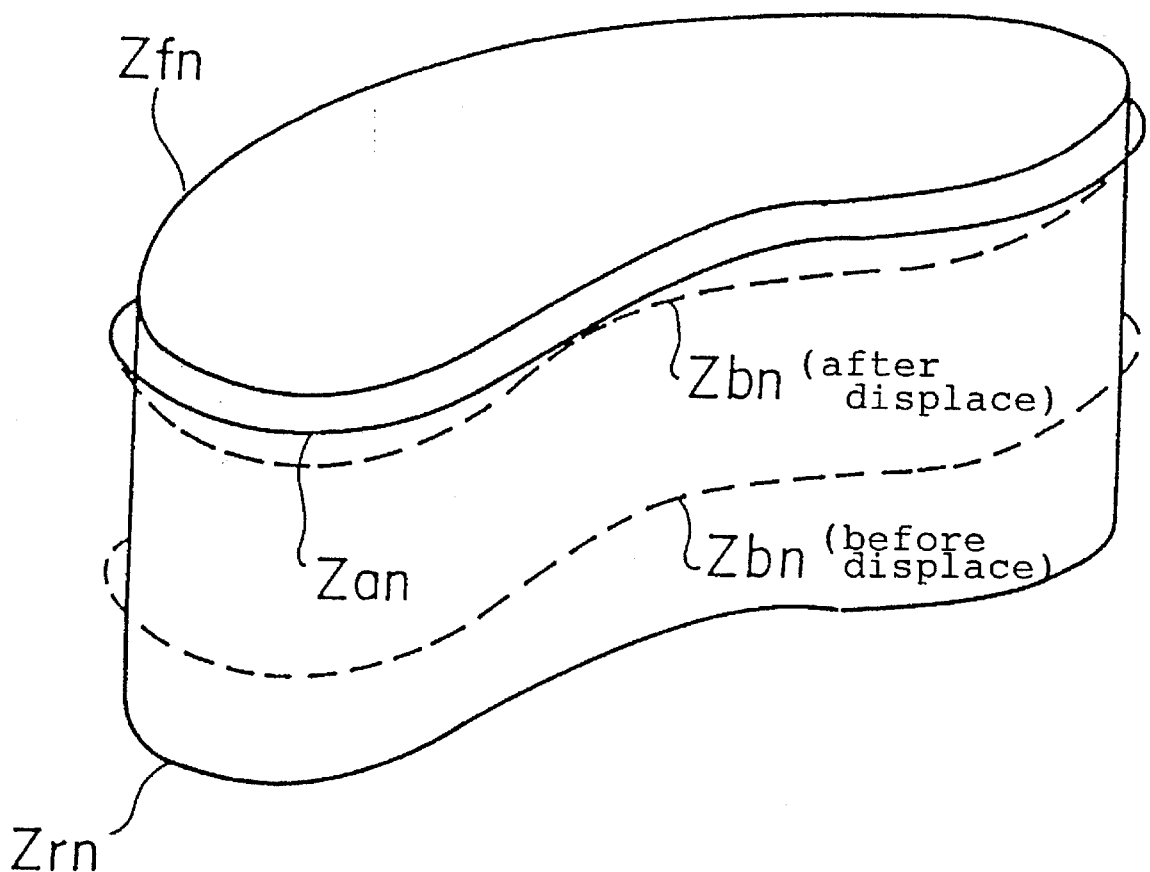
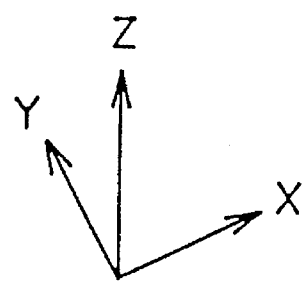
FIG. 24

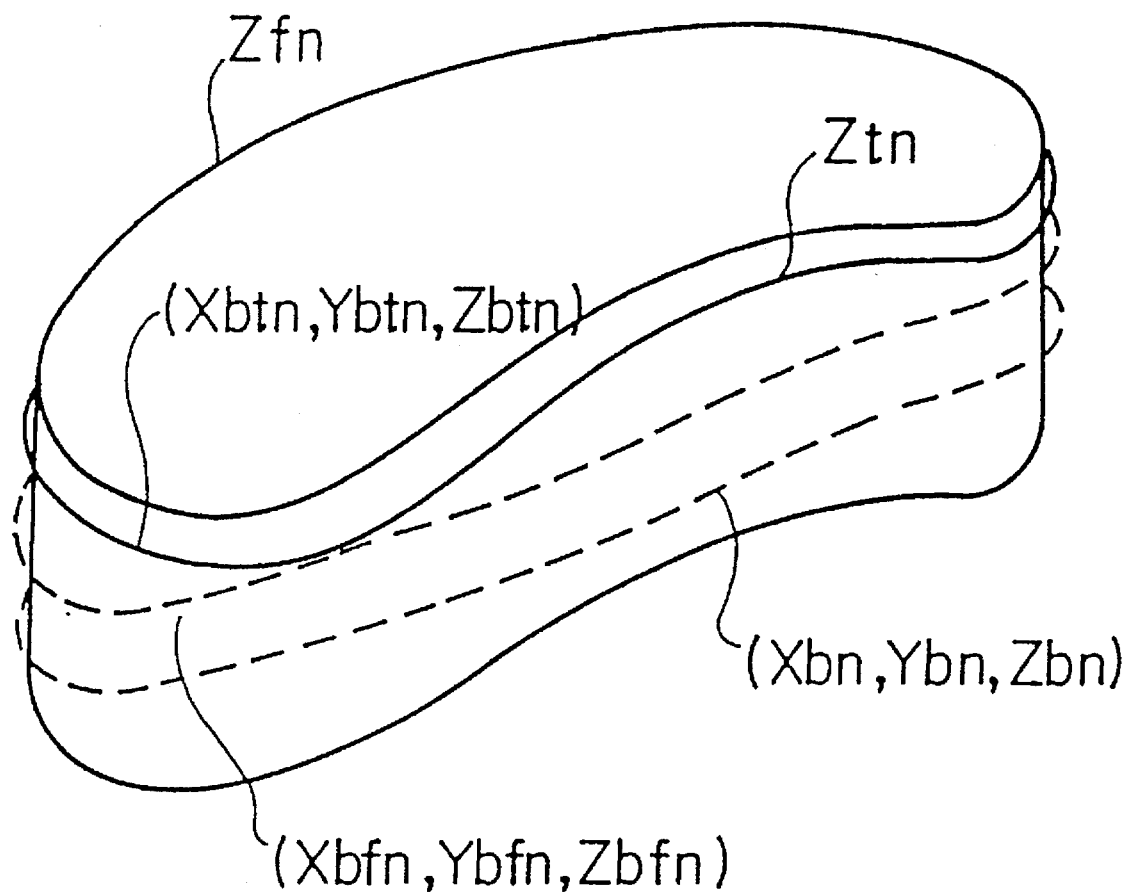
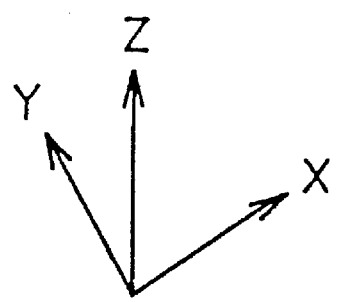
FIG. 25

SPECTACLE LENS SUPPLY METHOD

BACKGROUND OF THE INVENTION

1. Field of the Invention

The present invention relates to a spectacle lens supply method, and more particularly, to a spectacle lens supply method for a system which includes a terminal installed at a lens order side and at least a computing device installed at a lens processor side and connected to the terminal through a communication line, for supplying spectacle lenses.

2. Description of the Related Art

Conventionally, a variety of operations must be conducted at a spectacle store or the like before spectacles having lenses set in a frame are supplied to an orderer. First, spectacle lenses to be used are determined at the spectacle store based on the prescription for the person who orders and the shape and size of a frame to be used, and an order for the lenses is placed with a lens manufacturer. The lenses, when delivered from the manufacturer, are edged and beveled with various machines at the spectacle store in accordance with the prescription, lens information and frame information. Thereafter, such lenses are fitted in the frame. In the following descriptions, a step of grinding lenses according to the frame shape is called "edging," and a step of forming a bevel on an edged lens is called "beveling."

The series of operations described above requires knowledge of spectacle lens optics, knowledge of ophthalmophysiology, and a comprehensive technique of expertise-based framing and fitting for the adjustment of spectacles.

Presently, lenses to be used are determined by a skilled person, and not by an apparatus, taking the beveling step into consideration. Namely, a technique has not yet been developed for making calculations to predict shape of a beveled lens, and a disadvantage often arises in that a bevel cannot be formed at an optimal position because of an improper lens shape (external shape of the lens, shapes of the front and rear surfaces of the lens, lens thickness, etc.).

For example, the bevel curve of the spectacle lens may become moderate (less steep) compared with the curve of the frame (rim), depending on the bevel position selected, and in this case the frame is deformed so as to be matched with the bevel curve. However, deforming the frame can result in an increase of the frame size beyond the values calculated when the bevel position was selected, and thus in deficiency of the outer diameter or edge thickness of the lens.

When using a frame that may not be deformed, the bevel of the spectacle lens must be matched with the three-dimensional shape of the frame. Depending on the lens thickness and the frame shape, however, the bevel curve may extend out from the edge surface of the lens, making the bevel formation impossible.

Even though the lenses can be fitted in the frame, the outward appearance of the finished spectacles may be poor due to improper bevel position or improper lens shape, making the user feel dissatisfied with the spectacles. For example, the user may be discontented with the spectacles because the edge of the lens is too thick, or because the bulge of the front surface of the lens from the rim is too conspicuous. To avoid such awkward situations, a system is demanded by which the shape of finished lenses can be predicted for confirmation before actual lens processing, and which permits change of lenses to one made of a material having, e.g., a higher refractive index, or to one having a more moderate front curve, after the confirmation.

When formulating a spectacle lens supply system which can previously provide information as to whether a lens process including beveling is possible or not, so that lenses to be used can be determined or an optimum bevel can be set based on the information, the following preconditions are required. Namely, transmission of frame shape data from the orderer side to the processor side via a communication line must be as accurate as possible, and then reproduction of the frame shape at the processor side must be as accurate as possible; bevel process/design must be carried out in advance at the processor side so that beveled lenses can be properly fitted in the frame; a desired part of the predicted shape of finished lenses can be easily and closely examined at the order side; and so forth.

SUMMARY OF THE INVENTION

A first object of the present invention is to provide a spectacle lens supply method which is capable of previously providing information as to whether a lens process including beveling is possible or not, so that lenses to be used can be determined or an optimum bevel can be set based on the information, thereby avoiding situations where a bevel cannot be formed at an appropriate position because of an improper lens shape.

A second object of the present invention is to provide a spectacle lens supply method by which frame shape data can be transmitted from a lens order side to a lens processor side via a communication line as accurately as possible, whereby the frame shape can be subsequently reproduced at the processor side as accurately as possible.

A third object of the present invention is to provide a spectacle lens supply method in which bevel process/design is carried out in advance at the lens processor side so that beveled lenses can be properly fitted in the frame.

A fourth object of the present invention is to provide a spectacle lens supply method which permits the order side to easily and closely examine a desired part of a predicted shape of finished lenses.

To achieve the above objects, the present invention provides a spectacle lens supply method for a system which includes a terminal installed at a lens order side and a computing device installed at a lens processor side and connected to the terminal through a communication line, for supplying spectacle lenses. The spectacle lens supply method includes: a first step of transmitting processing condition data, which includes at least one of lens information, frame information, prescription values, layout information and processing information, from the terminal to the computing device; a second step of calculating a desired lens shape including a bevel figure by the computing device in accordance with the processing condition data transmitted thereto; a third step of creating accept/reject information as to whether a lens process including a beveling is possible or not, by the computing device in accordance with the result of the calculation, and transmitting the accept/reject information to the terminal; and a fourth step of displaying the transmitted accept/reject information at the terminal to permit the orderer side to learn whether the lens process including the beveling is possible or not.

Preferably, the first step includes transmitting the processing condition data of a spectacle lens from the terminal to the computing device; the second step includes a step (2a) of calculating a shape of an edged lens based on the processing condition data, and a step (2b) of creating an estimated solid figure of the lens based on the calculated shape of the edged lens; the third step comprises transmitting the estimated solid figure from the computing device to the terminal; and the fourth step comprises displaying the estimated solid figure, together with auxiliary lines based on the estimated solid figure and extending along front and rear surfaces of the lens, respectively.

The second step may include a step (2a) of setting a bevel with respect to an edge of a spectacle lens according to a specified beveling mode, a step (2b) of calculating an amount of deformation of a frame shape which will be caused if the frame shape is deformed so as to be matched with the set bevel, and a step (2c) of comparing the calculated deformation amount with a predetermined reference value. In this case, the third step includes creating information as to whether deformation of the frame shape is possible or not, based on the result of the comparison, and transmitting the created information to the terminal.

The first step may include the steps of transmitting, as the frame information, two-dimensional coordinates obtained by projecting a three-dimensional shape of a frame onto a plane, parameter values defining a curved surface approximate to the three-dimensional frame shape, and an actual measured value representing the size of a predetermined part of the frame. In this case, the second step includes reproducing coordinates of the three-dimensional frame shape based on the frame information, calculating the size of the predetermined part of the frame based on the reproduced coordinates of the three-dimensional frame shape, obtaining a correction coefficient based on a ratio between the calculated size of the predetermined part of the frame and the actual measured value representing the size of the predetermined part of the frame, correcting the reproduced coordinates of the three-dimensional frame shape based on the correction coefficient, to correct an error associated with the reproduction of the frame shape, and setting a bevel based on the thus corrected frame shape.

Further, the second step may include the steps of setting a first bevel with respect to an edge of a spectacle lens by using the processing condition data transmitted in the first step and according to a specified beveling mode; deforming a frame shape without changing a circumference thereof such that a Z-axis component, which is a coordinate component in the direction of a thickness of an edge of the frame shape, coincides with a Z-axis component of the first bevel shape; locating an eyepoint with respect to the deformed frame shape, the eyepoint being a point on a front surface of the lens corresponding to a pupil; obtaining an error between the located eyepoint and an eyepoint previously specified in the first step as the processing condition data; correcting the eyepoint of the deformed frame shape based on the obtained error; and setting a bevel of the spectacle lens by using the corrected eyepoint as the layout information specifying processing conditions.

The aforementioned bevel figure is defined as a bevel figure including data on a bevel curve and a bevel position with respect to an edge of a spectacle lens. The thus defined bevel figure will be referred to in the following description.

The above and other objects, features and advantages of the present invention will become apparent from the following description when taken in conjunction with the accompanying drawings which illustrate preferred embodiments of the present invention by way of examples.

BRIEF DESCRIPTION OF THE DRAWINGS

FIG. 6 is an example of an order entry screen for specifying lens types;

FIG. 10 is an example of a solid figure displayed on the screen of the display device;

FIG. 15 is a perspective view showing the relationships between individual constants associated with a torical surface and orthogonal coordinates;

FIG. 24 is a perspective view of a lens, showing the vertex of a bevel;

FIG. 25 is a perspective view of a lens, showing the vertex of a bevel;

DESCRIPTION OF THE PREFERRED EMBODIMENTS

Figure 1:
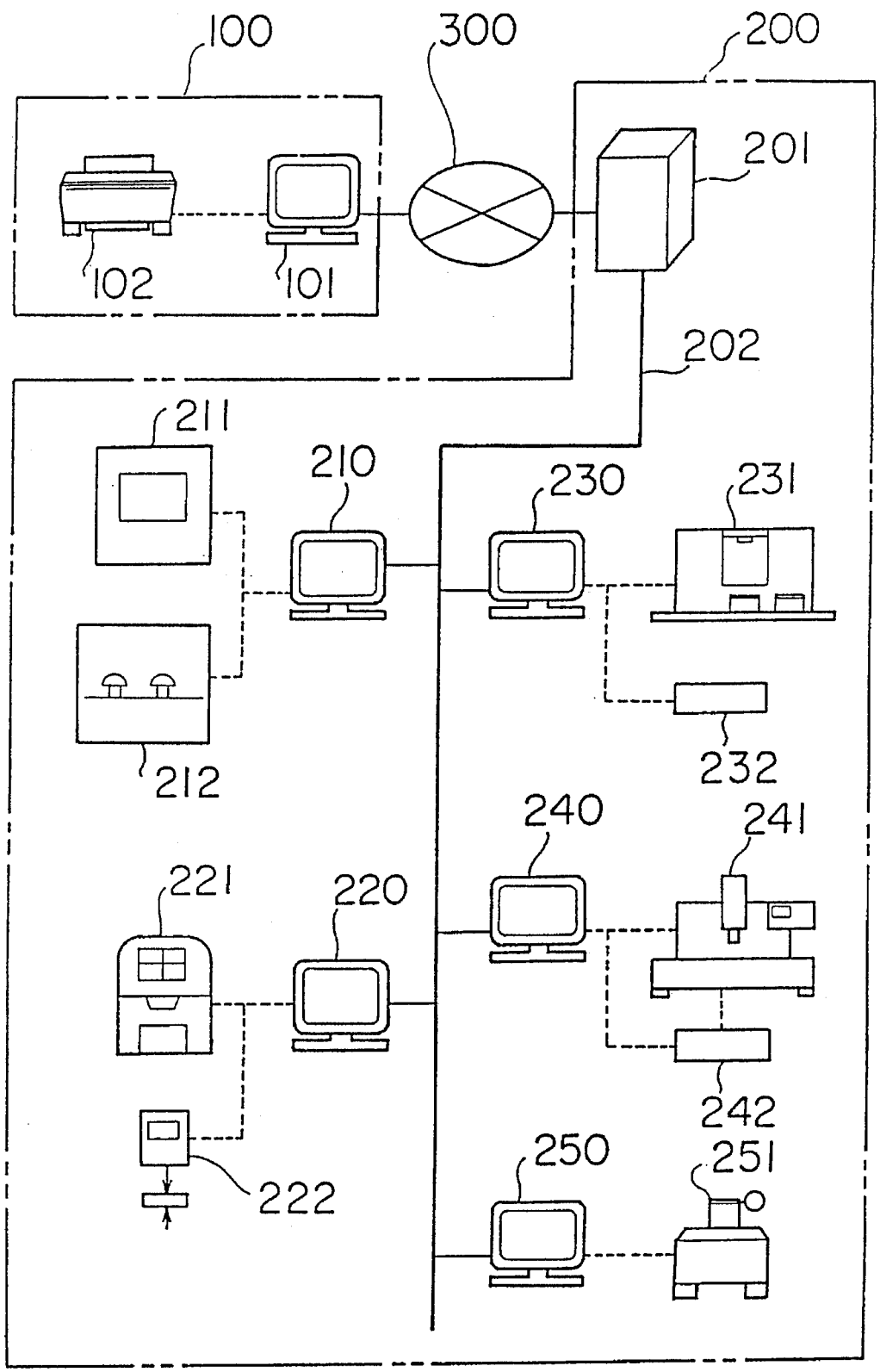
FIG. 1 is a diagram illustrating the entire configuration of a spectacle lens supply system.

FIG. 1 illustrates the entire structural arrangement of a spectacle lens supply system. A spectacle store 100, which is an order side, is connected to a lens maker's factory 200, which is a lens processor side, via a public communication line 300. Although the figure illustrates only one spectacle store, in practice a plurality of spectacle stores are connected to the factory 200.

Installed in the spectacle store 100 are an on-line terminal computer 101 and a frame shape measuring apparatus 102. The terminal computer 101 includes a keyboard as an input device and a CRT display device, and is connected to the public communication line 300. Actual measured values of a spectacle frame are supplied from the frame shape measuring apparatus 102 to the terminal computer 101 to be processed thereby. Also spectacle lens information, prescription values, etc. are input to the computer 101 through the keyboard. Output data from the terminal computer 101 is transferred on-line to a mainframe 201 in the factory 200 through the public communication line 300. A relay station may be provided between the terminal computer 101 and the mainframe 201. Further, the location where the terminal computer 101 is installed is not limited to the spectacle store 100.

The mainframe 201 stores a spectacle lens process/design program, a bevel process/design program, etc., computes a lens shape including a bevel figure in accordance with the input data, and transfers the results of computations to the terminal computer 101 through the public communication line 300 to be displayed at the display device, as well as to terminal computers 210, 220, 230, 240 and 250 in the factory 200 via a LAN 202.

The terminal computer 210 is connected to a rough edger (curve generator) 211 and a sand polisher 212. In accordance with the results of computations supplied from the mainframe 201, the computer 210 controls the rough edger 211 and the sand polisher 212 to finish the curved rear surface of a lens with a front surface having already been finished.

The terminal computer 220 is connected to a lens meter 221 and a thickness gauge 222. The terminal computer 220 compares measurement values obtained by the lens meter 221 and the thickness gauge 222 with the results of computations supplied from the mainframe 201, to perform an acceptance/rejection inspection on each lens with a curved rear (back) surface having been finished, and places a mark (three-point mark) indicating the optical center on each of the accepted tenses.

The terminal computer 230 is connected to a marker 231 and an image processor 232. In accordance with the results of computations supplied from the mainframe 201, the computer 230 determines a blocking position at which a lens is to be blocked (held) when edging and beveling are carried out, and puts a mark indicating the blocking position. A blocking jig is fixed on the lens at the blocking position.

The terminal computer 240 is connected to a numerically controlled (NC) lens grinding machine 241 composed of a machining center, and a chuck interlock 242. In accordance with the results of computations supplied from the mainframe 201, the terminal computer 240 carries out edging and beveling of lenses.

The terminal computer 250 is connected to a measuring apparatus 251 for measuring the figure of a bevel vertex. The terminal computer 250 compares the circumference and shape of a beveled lens, measured by the apparatus 251, with the results of computations supplied from the mainframe 210, to determine whether the process is acceptable or not.

Referring now to FIGS. 2 to 6, the process flow for supplying spectacle lenses in the above-described system is hereinafter described. The process flow is classified into an "inquiry" process and an "order" process. The "inquiry" process is a process wherein the spectacle store 100 requests the factory 200 to provide information as to predicted shape of finished lenses after a lens processing including beveling, and the "order" process is a process wherein the spectacle store 100 requests the factory 200 to deliver unedged lenses or beveled lenses.

Figure 2:
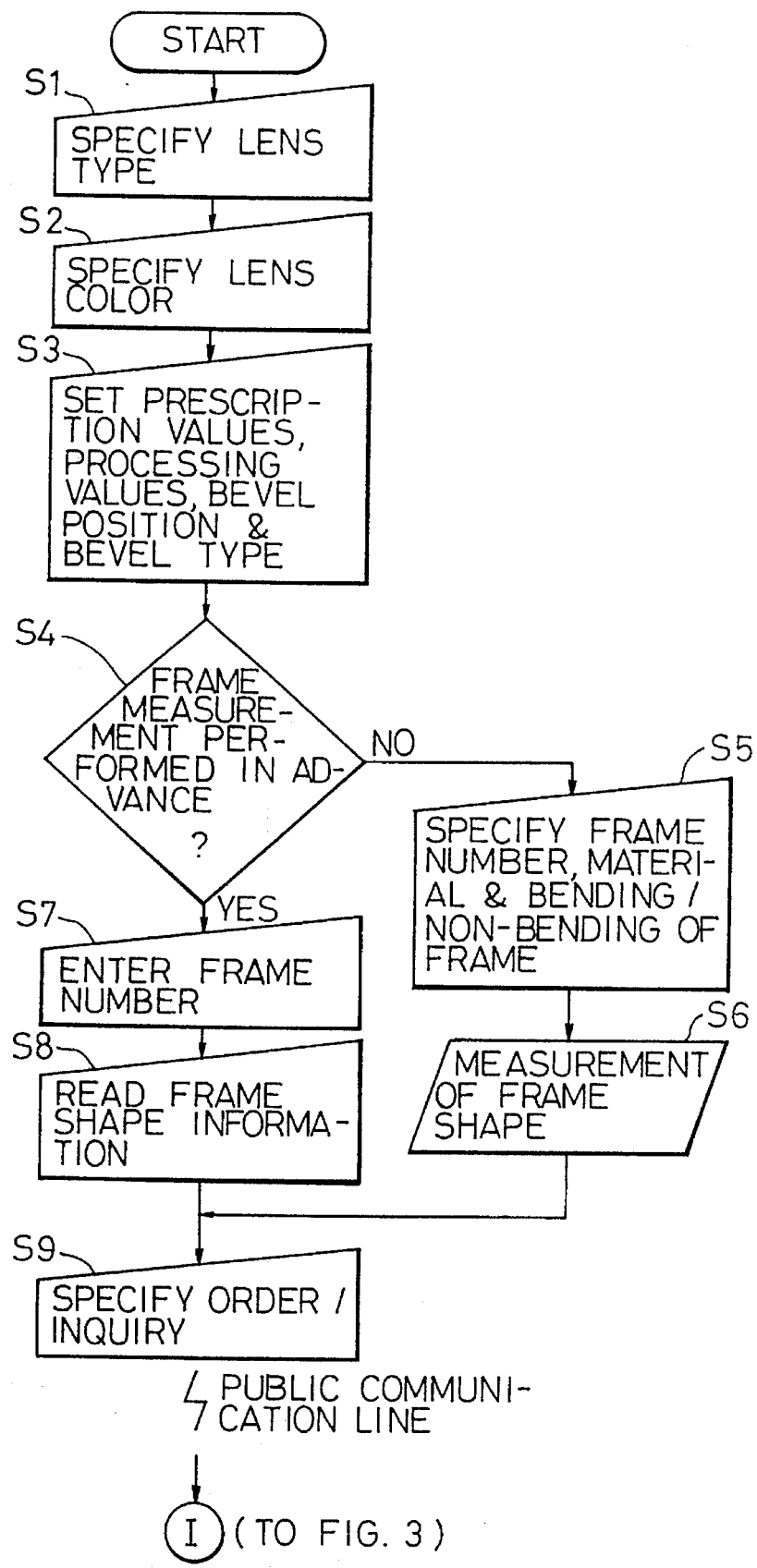
FIG. 2 is a flow chart showing an initial input process carried out on the part of a spectacle store.

FIG. 2 is a flow chart showing an initial input process carried out on the part of the spectacle store 100. In the chart, numbers following "S" denote step numbers.

[S1] A lens order/inquiry program is started in the terminal computer 101 of the spectacle store 100, and an order entry screen is displayed at the display device. While the order entry screen, the operator at the spectacle store 100 specifies a lens type to be ordered or inquired through the keyboard.

FIG. 6 shows an example of the order entry screen used for specifying lens types. In a field 61, a lens type is specified. More specifically, a maker's article classification code is entered, whereby lens material, refractive index, coating, lens color, optical design for lens surface, outer diameter, etc. are specified. In the case of an inquiry, two lens types can be specified. At item "FORM" in a field 65 is specified whether a lens to be ordered or inquired is a beveled lens (HELP) or an unedged, unbeveled lens. At item "METS PROCESS" in the field 65, details of process are specified, such as reduction of the lens thickness to the smallest possible value, chamfering of the edge of a minus lens to make it inconspicuous, and polishing of the chamfered surface.

As shown in FIG. 6, a soft key menu 66 is displayed at the bottom of the order entry screen. The illustrated example includes a "TRANSMIT" key 66a for transmitting data registered on screen, a "REGISTER" key 66b for registering data entered on screen, an "ORDER" key 66c for switching the screen to an order screen, a "CLEAR" key 66d, a "PAGE" key 66e for specifying a page, and an "END" key 66f for entering a command to end the data registration. These soft keys are selected for execution through operation of function keys on the keyboard of the terminal computer 101.

[S2] A lens color is specified in the field 61 of FIG. 6.

[S3] Prescription values, such as spherical and cylindrical refracting powers, astigmatism axes, and additions for the right and left eyes, are entered in the left side of the field 62 in FIG. 6, and processing values for the lens are entered in the right side of the same field 62. Spectacle frame information is entered in the field 63, and layout information, such as PD, NPD (near vision PD), SEG (SEGMENT lens position), ET (minimum edge thickness) and EP (eyepoint), beveling mode, and bevel figure including bevel position are input in the field 64. The layout information specifies the eyepoint corresponding to the pupil, with respect to the frame. As the frame information, all necessary frame information such as maker's article classification code, frame size, frame material, color, shape and frame pattern is entered, and in the case of an inquiry, up to two frame types can be included in the frame information where the number of lens types specified in Step S1 is "1."

General processing steps can be specified in "PROCESS 1" to "PROCESS 4" of the order entry screen, and as the lens processing values, lens thickness, edge thickness, values relating to prism, decentration, outer diameter and front curve (base curve), etc. are entered.

The beveling mode includes "1:1", "1:2", "FRONT CURVE TRACING", "FRAME TRACING" and "AUTO-BEVELING" modes, which are specified according to where in the lens edge a bevel is to be formed. The "FRONT CURVE TRACING" is a mode in which a bevel is formed so as to adjoin the front (obverse) surface of a lens.

Entry of bevel position is permitted when the selected beveling mode is "FRONT CURVE TRACING", "FRAME TRACING" or "AUTO-BEVELING". The bevel position indicates how much the bevel should be shifted from the front edge of the lens toward the rear thereof, and can be set in units of 0.5 mm. Thus, even if the frame rim is thick and the distance between the front face of the frame and a bevel groove is large, a bevel vertex can be positioned such that the front surface of the lens is flush with the front face of the frame, by entering a suitable bevel position.

For the bevel figure, "STANDARD BEVEL", "BEVEL FOR COMBINATION FRAME", "GROOVE" or "FLAT EDGE" is selected. "BEVEL FOR COMBINATION FRAME" is selected when decorative parts are attached to the frame rims so that the lenses contact the decorative parts. Grooved edge and flat edge can be specified as a choice of bevel figure.

[S4] It is determined whether the shape of the frame specified in the field 63 is already measured by the frame shape measuring apparatus 102 shown in FIG. 1. If the measurement is completed, the program proceeds to Step S7, and if not, the program proceeds to Step S5.

[S5] First, the program executed by the terminal computer 101 at the spectacle store 100 switches from the lens order/inquiry program to a frame shape measurement program. Then, a measurement number attached to the frame whose shape is to be measured is entered. Also, the material (metal, plastic material or the like) of the frame is specified, and further, whether the frame may be bent or not is entered. The frame material data is used in the calculation of Step S12 as a parameter for correcting the circumference of the bevel vertex in accordance with the material used, such that the lenses fit in the frame rims when set in the frame. If the lenses cannot be set in the frame without deforming the frame rims although it is specified that the frame should not be bent, an error message is displayed at the display device of the terminal computer 101 at the spectacle store 100 to reject such an order.

[S6] The frame to be measured is fixed in the frame shape measuring apparatus 102 and the measurement is started. The frame shape measuring apparatus 102 causes probes thereof to contact the bevel grooves of the right and left frame rims, respectively, and then to turn about a predetermined point to thereby obtain cylindrical coordinates (Rn, θn, Zn) (n=1, 2, ..., N) representing the three-dimensional figure of each bevel groove. The obtained data is supplied to the terminal computer 101. The terminal computer 101 subjects the received data to a smoothing process as required (in some cases, the smoothing is not necessary), and calculates the coordinates (a, b, c) of the center of a torical surface, base radius RB, cross radius RC, unit vector (p, q, r) in the direction of the axis of rotation symmetry of the torical surface, or frame curve (curvature of a spherical surface where the frame rim can be regarded as being situated on the spherical surface) CV, circumference FLN of the bevel groove, frame PD (pupillary distance) FPD, inter-rim distance DBL, maximum width A and maximum height B of the frame rim, effective diameter ED (twice the radius vector), and tilt angle TILT at which the left and right frame rims are inclined. The circumference FLN of the bevel groove is computed in the following manner:

First, the three-dimensional polar coordinates of the measured frame rim are transformed into orthogona coordinates (Xn, Yn, Zn) (n=1, 2, 3, ..., N), based on which the circumference FLN of the frame rim (circumference of the bottom of the groove cut in the inner peripheral surface of the frame rim) is calculated. The circumference FLN of the frame rim is given as the summation of distances between adjacent ones of points on the frame rim, as indicated by the following equation (1):

$$FLN = \Sigma[((X_i - X_{i+1})^2 + (Y_i - Y_{i+1})^2 + (Z_i - Z_{i+1})^2)^{1/2}] (i=1 \ldots N) \quad (1)$$

In the equation (1), when i=N, "1" is used for (i+1).

The data thus computed is displayed at the display device. If the data contains significant discrepancy or there is a large difference between the measured shapes of the right and left frame rims, such an erroneous state is shown at the display device as an error message.

Figure 7:
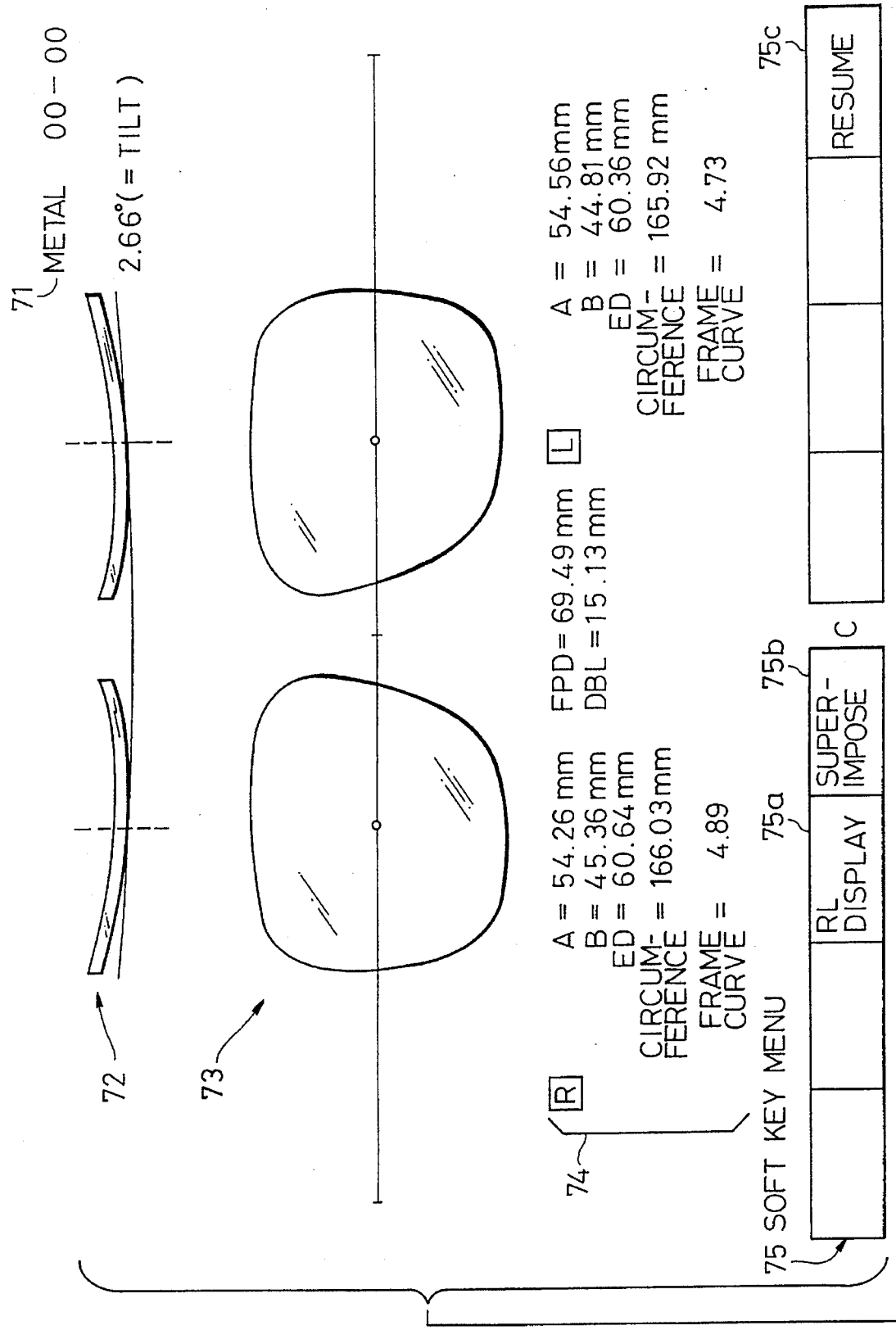
FIG. 7 is an example of display information on a display device showing results of measurement of a frame shape.

FIG. 7 shows an example of a screen displayed at the display device and indicating the results of the measurement of the frame shape. As illustrated, a top view (72) and a front view (73) of the bevel grooves in a frame made of a metal (71) are displayed on screen, and also the calculated values (74) associated with the right (R) and left (L) frame rims are shown.

At the bottom of the screen, a soft key menu 75 is displayed. As shown in FIG. 7, the soft key menu 75 includes an RL display key 75a for selecting a screen in which both the right (R) and left (L) lenses are displayed, a superimposed screen select key 75b for selecting a screen in which the lenses are superimposed one upon the other, and a resume key 75c for returning to an initial screen.

In the case where an error message indicating that the data includes significant discrepancy is displayed on the display device at the spectacle store 100, the frame is checked to see if foreign matter adheres to any groove of the frame or the frame was measured with a joint thereof disconnected or with a gap opening in the frame, and the measurement is carried out again. When an error message indicating that there is a large difference between the shapes of the right and left frame rims is displayed at the display device, and if the difference is within an allowable range, the process may proceed so as to accept the difference as allowable. If the difference is outside the allowable range, the frame may be manually deformed for remeasurement, or the shapes of the right and left frame rims may be averaged so that merging may be specified to employ the calculated average values as representing the frame shape. [S7] If the frame shape is already measured and the results of the measurement are stored, the measurement number affixed to the frame is entered to retrieve the stored measurement values. [S8] In accordance with the entered measurement number, stored information representing the shape of the corresponding frame is read from an internal storage medium.

Execution of Steps S1 to S8, as described above, permits transmission of processing condition data which includes at least one of the lens information, frame information, prescription data, layout information and processing information.

[S9] "INQUIRY" or "ORDER" is specified at the field 60 in the order entry screen shown in FIG. 6.

The data obtained in the aforementioned steps, such as the lens information, prescription values, frame information, etc., is transmitted to the mainframe 201 at the factory 200 through the public communication line 300. The frame information includes the two-dimensional polar coordinates (Rn, θn) (n=1, 2, ..., N), coordinates (a, b, c) of the center of the torical surface, base radius RB, cross radius RC, unit vector (p, q, r) in the direction of the axis of rotation symmetry of the torical surface, or the frame curve CV, circumference FLN of the bevel groove, frame PD (pupillary distance) FPD, inter-rim distance DBL, lengths A and B, effective diameter ED, tilt angle TILT, etc.

While the data transmission is in progress, a message indicating that the transmission is under way is displayed at the terminal computer 101 in the spectacle store 100. When ordering lenses, group transmission is available by which a maximum of, e.g., up to 15 orders can be transmitted at a time, thereby shortening the transmission time. In the group transmission, the contents of orders are checked one by one and temporarily stored, and then the orders are collectively transmitted.

Figure 3:
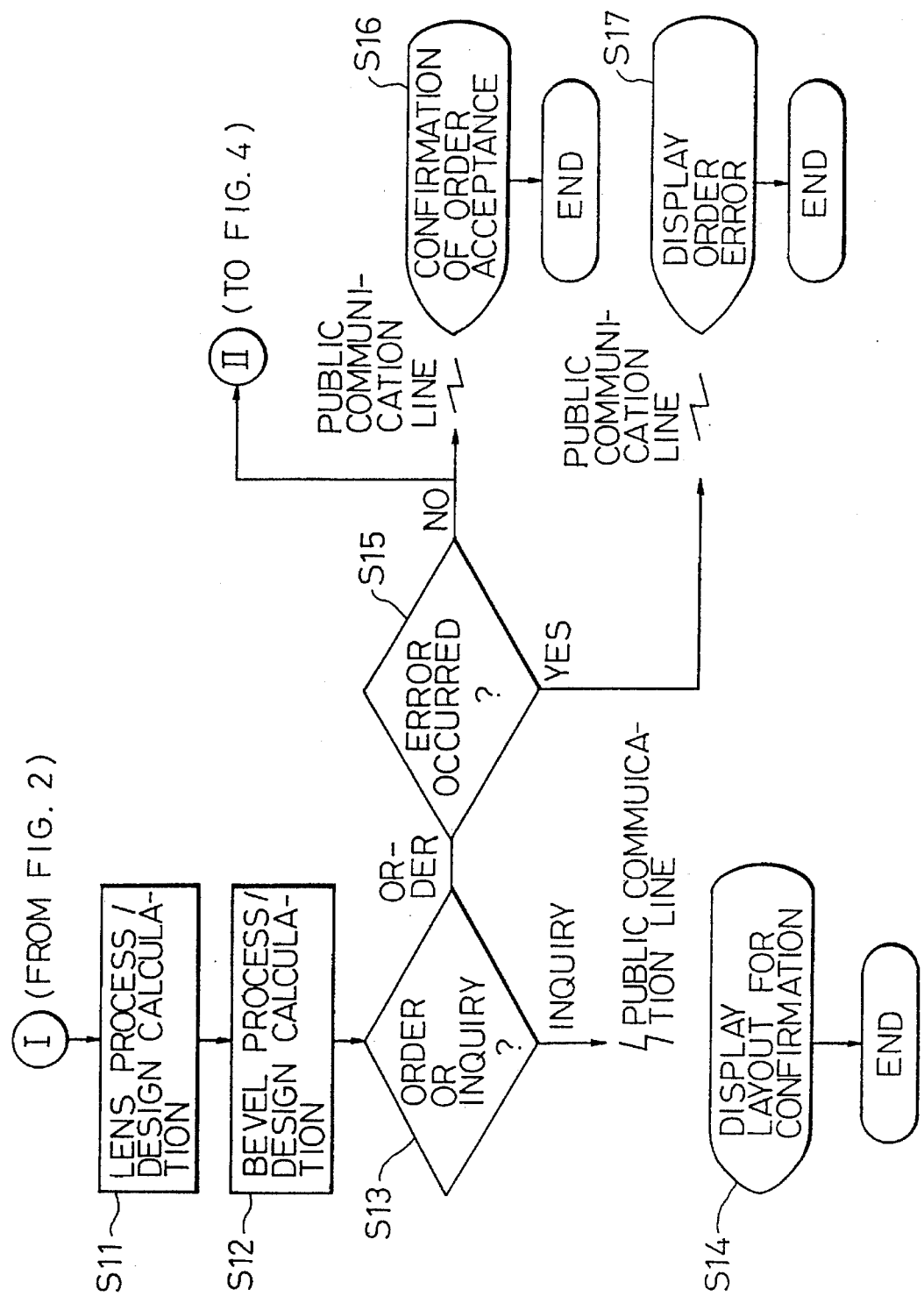
FIG. 3 is a flow chart showing a process executed on the side of a factory, a step of confirmation by a spectacle store in response to data transferred from the factory, and a step of error indication.

FIG. 3 is a flow chart showing a flow of process executed on the side of the factory 200, confirmation steps for the data transferred from the factory 200 to the spectacle store 100, and error display steps. In the chart, numbers following "S" represent step numbers.

[S11] The mainframe 201 at the factory 200 stores a lens order receipt system program, a lens process/design program, and a bevel process/design program. When the processing condition data (such as, the lens information, prescription values, frame information), layout information, and bevel information is received via the public communication line 300, the lens process/design program is started following the lens order receipt system program, to carry out lens process/design calculation. Namely, a desired lens shape including a bevel figure is calculated.

First, based on the frame shape information, prescription values and layout information, it is determined whether the outer diameter of the specified lens is large enough. If the outer diameter of the lens is deficient, the lens order receipt system program is restarred to calculate the direction and amount of the deficiency in a boxing system and to display the obtained data at the terminal computer 101 in the spectacle store 100 (see, Step S146 as described later).

If the outer diameter of the lens is large enough, the front curve of the lens is determined. This determination is made by separately determining the front curves of the right and left lenses, based on the prescription values for the right and left lenses, and then making the right and left front curves identical with each other. This step is, however, skipped in the case where the right and left front curves of aspherical monofocal lenses should be different from each other. For aspherical monofocal lenses, the front curve is approximately expressed by an aspherical surface of secondary or fourth degree, and for progressive multifocal lenses, the front curve is approximately expressed by an aspherical surface of secondary or fourth degree in individual directions.

Subsequently, the lens thickness is determined. Usually, since the outer diameter of the lens is set by the prescription value, the lens thickness is determined based on the outer diameter, standard edge thickness, and prescription values. If the process is specified such that the lens thickness must be as small as possible, the edge thickness is detected along the entire circumference for each radius vector of the individual directions of the frame, based on the frame shape information, layout information and prescription values, and a lens thickness according to the specification is determined.

After determining the lens thickness, a rear curve of the lens, prism values, and a base direction of the prism are computed, thus determining the entire shape of the unedged lens.

Then, the edge thickness is checked along the entire circumference for each radius vector of the individual directions of the in order to determine whether any edge portion fails to satisfy the required edge thickness. If an edge portion has a deficient thickness, the lens order receipt system program is restarted to calculate the direction and amount of the deficiency in the boxing system and to display the obtained data at the terminal computer 101 in the spectacle store 100 (see Step S146).

If the edge thickness is large enough along the entire circumference, the weight of the lens, maximum and minimum edge thicknesses, the directions of the maximum and minimum edge thicknesses, etc. are calculated.

Then, processing values necessary for the terminal computer 210 at the factory 200 to process the rear surface of the lens are computed.

These computations are necessary for a lens polishing process carried out by the terminal computer 210, rough edger 211, and sand polisher 212 prior to the edging, and the computed various values are transferred to the subsequent step.

A lens which is previously processed and in stock may be specified, making it unnecessary to carry out the lens polishing process prior to the edging. In such a case, since the outer diameter, thickness, front curve and rear curve of the lens are already determined based on the lens type and the prescription values and are stored, the stored data is read, the outer diameter and edge thickness of the lens is checked for deficiency, as in the case of a lens whose rear surface is not processed, and the data is transferred to the subsequent step. Also in the case of a stocked lens, the front curve of an aspherical monofocal lens or progressive multifocal lens is approximately expressed by an aspherical surface as required, like polished lenses.

[S12] In the mainframe 201, the bevel process/design program is started following the lens order receipt system program, to carry out bevel process/design calculation.

First, the three-dimensional data representing the frame shape is corrected according to the frame material in order to correct error in the frame shape data attributable to the frame material.

Then, the three-dimensional relationship between the frame position and the lens position is determined based on the eyepoint.

An origin for lens processing, which is used as a reference point when holding the lens for beveling, and an axis for lens processing, which is an axis of rotation, are determined, and the data obtained until this stage is transformed into corresponding data with reference to the set processing coordinate system.

Subsequently, a three-dimensional figure of the bevel edge (including a bevel contour) is determined according to the specified beveling mode. In this case, the three-dimensional figure of the bevel edge is deformed on condition that the circumference of the bevel remains the same, and a predicted amount of such deformation is computed. When the selected beveling mode is the frame tracing mode, or when the frame should not be bent, the shape of the bevel must be left unchanged. If the beveling cannot be implemented without altering the bevel figure, an error code is output (see Step S145 as discussed hereinafter).

The calculated amount of bevel edge deformation is compared with a deformation limit set for each of the frame materials, and if the deformation limit is exceeded, an error code is output (cf. Step S145 as discussed hereinafter).

The eyepoint shifts if the three-dimensional figure of the bevel edge is deformed or altered, and therefore, the resulting error is corrected. Also, an error associated with reproduction is corrected.

The processes discussed above can be selectively executed.

In this manner, calculation is performed for the three-dimensional beveling. Details of Step S12 will be explained later with reference to FIG. 14.

[S13] If "ORDER" was specified in Step S9 of FIG. 2, the program proceeds to Step S15. If "INQUIRY" has been specified, data responsive to the inquiry is transmitted to the terminal computer 101 at the spectacle store 100 via the public communication line 300, and the program proceeds to Step S14.

[S14] In this step, the terminal computer displays a predicted shape of beveled lens on the display device, based on the data transmitted from the mainframe 201 at the factory 200 in response to the inquiry, so that modification or confirmation of the data may be made. Step S14 will be described in detail with reference to FIG. 5.

Figure 5:
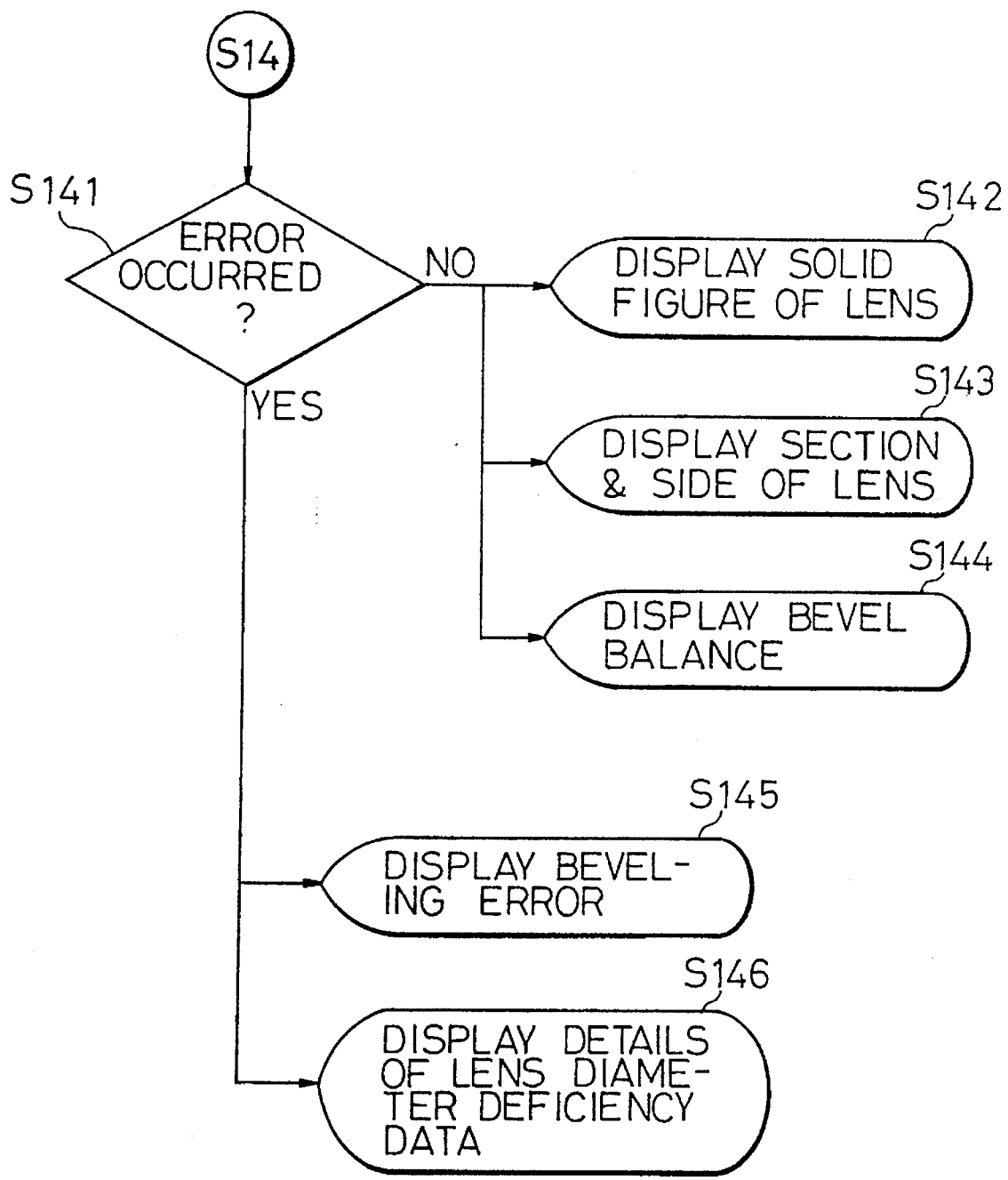
FIG. 5 is a flow chart showing details of Step S14 in FIG. 3.

In FIG. 5 showing Step S14 in detail, numbers following "S" denote step numbers.

[S141] It is determined whether an error has occurred in the process/design calculations in Steps S11 and S12 of FIG. 3. If no error has occurred, an order entry reception screen is displayed at the display device of the terminal computer 101 shown in FIG. 1. A layout confirmation view shown in FIG. 9 can be displayed through a soft key operation. The program then proceeds to one of Steps S142 to S144, in accordance with the figure type selected through a soft key operation. If an error has occurred, the program proceeds to Step S145 or S146, depending on the contents of the error.

Figure 8:
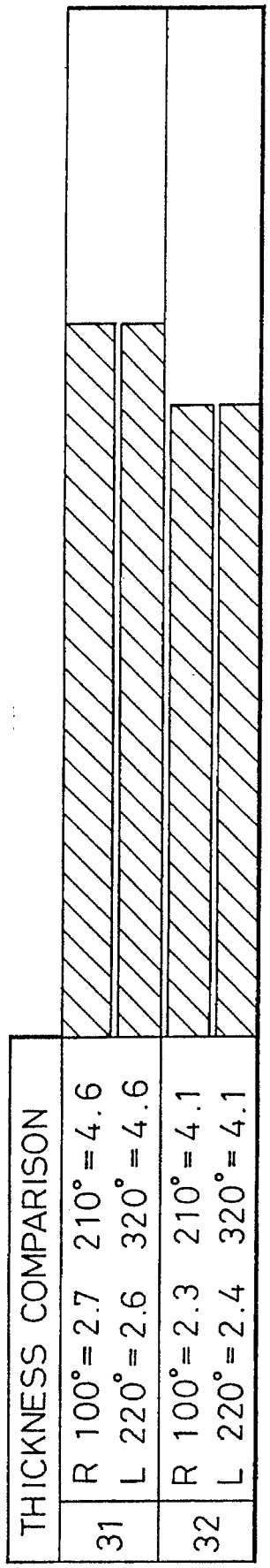
FIG. 8 is an example of an order entry acceptance screen displayed on the display screen.

FIG. 8 shows, by way of example, part of the order entry reception screen displayed at the display device. Specifically, the order entry reception screen is a combination of the order entry screen, shown in FIG. 6, and bar graphs indicating the thicknesses and weights of lenses, shown in FIG. 8. The bar graphs showing the thicknesses and weights of lenses (FIG. 8) permits comparison of the results of process between the two types of lenses.

Figure 9:
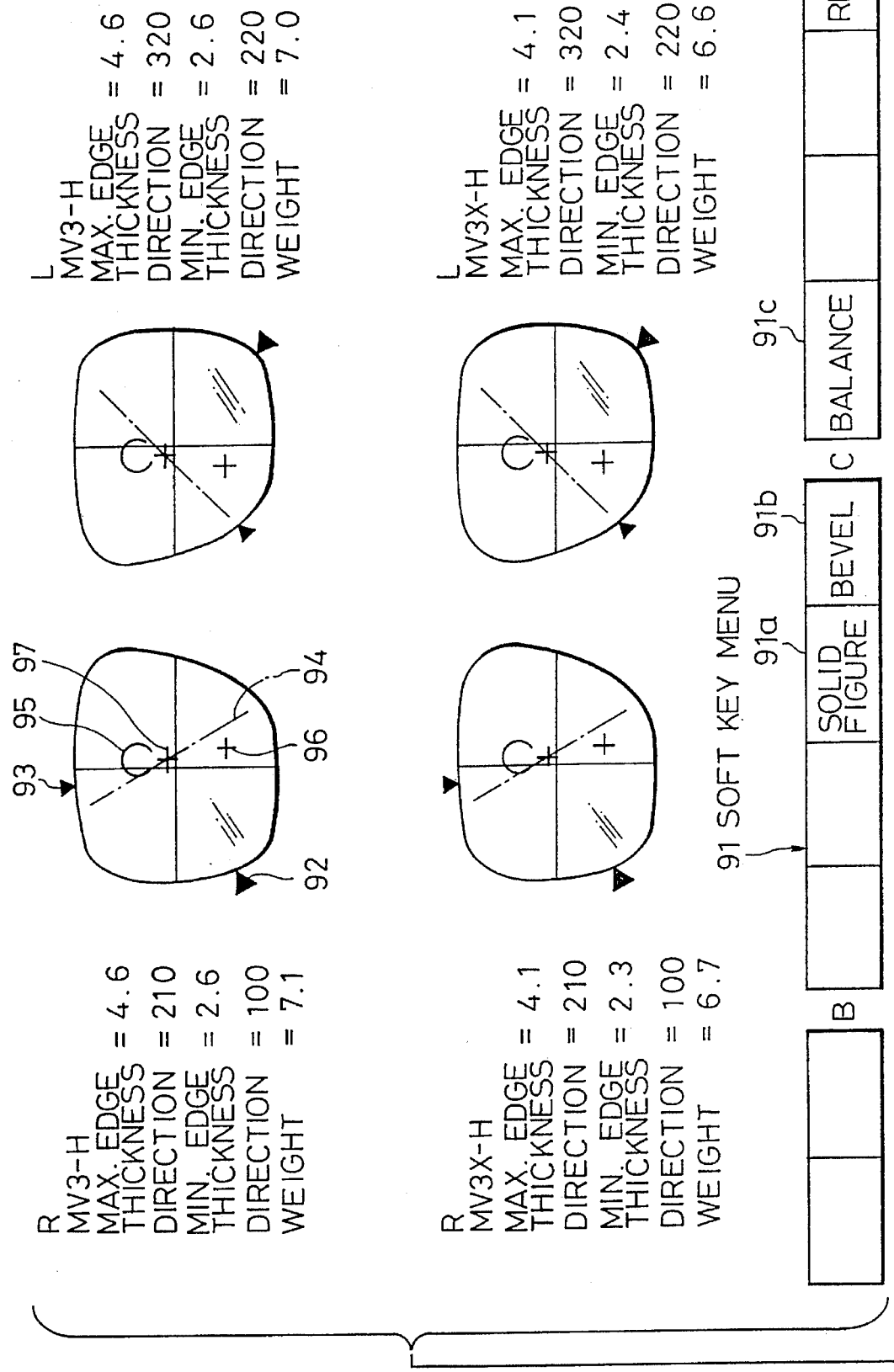
FIG. 9 shows an example of display information displayed on screen for layout confirmation.

FIG. 9 shows an example of the layout confirmation view displayed on the display screen. The confirmation view shows how two types of lenses are individually set in the frame (combinations #1 and 2), based on the specified layout information, for purposes of visual check. Also, the location 92 of maximum edge thickness, location 93 of minimum edge thickness, and numerical data such as the directions of the maximum and minimum thicknesses and the lens weight can be checked. Further, in addition to this information, the display screen shows an astigmatism axis 94, a far-vision degree measurement point 95, a near vision eyepoint 96, and a far vision eyepoint 97 for each of the lenses. Thus, whether the input layout information contains an error or not can be easily determined.

Figure 11:
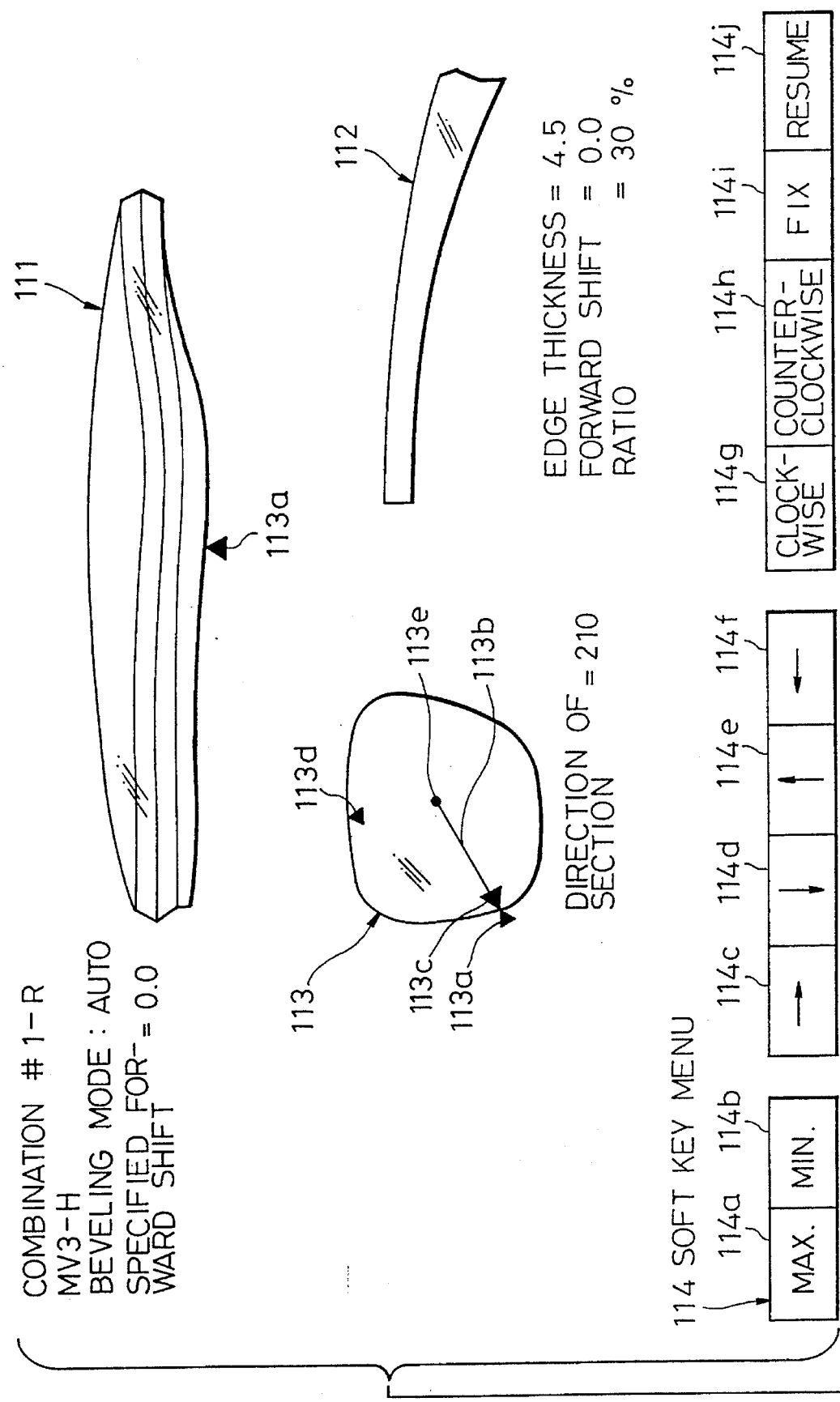
FIG. 11 is an example of display information displayed on the display device for the confirmation of beveling.
Figure 12:
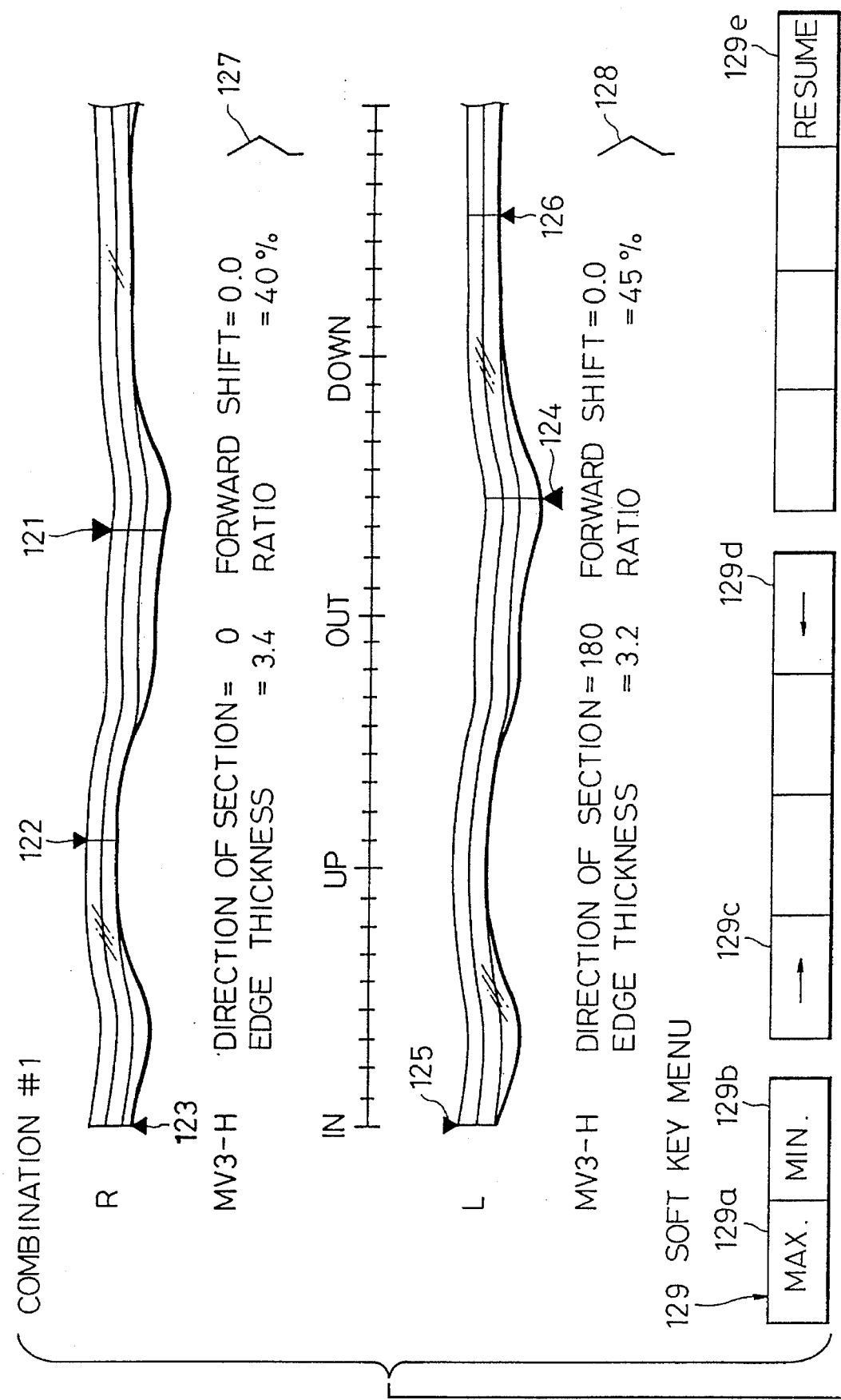
FIG. 12 is an example of display information on the display device showing a balance of right and left bevels.

At the bottom of the screen is displayed a soft key menu 91. The soft key menu 91 includes a solid figure display key 91a used to display a solid figure as shown in FIG. 10, a bevel display key 91b used to display a bevel view for confirmation as shown in FIG. 11, a bevel balance display key 91c used to display a bevel balance view as shown in FIG. 12, and a resume key 91d used to return to the initial screen.

[S142] This step is executed when the solid figure display key 91a shown in FIG. 9 is selected to display a solid figure.

FIG. 10 shows an example of such a solid figure displayed at the display device. On this screen, the right and left lenses are spatially positioned as if they are set in the frame, and the solid figure can be viewed in any desired direction. FIG. 10 illustrates the combination #1 shown in FIG. 9.

The viewing direction and size of the solid figure can be changed by means of a soft key menu 15 at the bottom of the screen. Specifically, the size of the displayed solid figure can be enlarged or reduced by an enlarge key 15a or reduce key 15b, and the viewing direction can be changed by operating direction keys 15c to 15f. Each time the function key on the keyboard corresponding to the enlarge key 15a or reduce key 15b is depressed, the size of the solid figure is enlarged or reduced little by little. Each time the function key corresponding to one of the direction keys 15c to 15f is depressed, the solid figure rotates through 30 degrees in the corresponding direction. FIG. 10 shows the lenses as viewed from a point which is on the right side of the wearer and shifted by 30 degrees toward the front and 30 degrees toward the bottom. A front view key 15g is used to un-tilt the inclined image, a full scale key 15f is used to cancel the enlargement or reduction, and a resume key 15i is used to return to the initial screen.

The screen of FIG. 10 shows, in addition to the solid figure, front and rear curves 11 and 12 of each lens, and auxiliary lines 13 and 14 extending along the curves 11 and 12, respectively. Thus, the operator can check the lenses as if he or she is viewing actual lenses. If the operator at the spectacle store 100 judges from the front and rear curves 11 and 12 on screen that the front curve of the lens is too conspicuous, then the front curve 11 may be set to a less steep curve or another lens type with a more moderate front curve 11 may be specified.

Further, the display screen shows an astigmatism axis 16, a far-vision degree measurement point 17, a near vision eyepoint 18, and a far vision eye-point 19 with respect to each lens.

[S143] This step is executed when the bevel display key 91b in FIG. 9 is selected to display a bevel view for confirmation.

FIG. 11 shows an example of such a bevel view displayed at the display device. In the upper part of the screen, a side view (111) of the right lens of the combination #1 is displayed, and in the lower left part of the screen, a plan view (113) of the lens is displayed. A cursor 113a in each of the views 111 and 113 can be moved along the edge of the lens through operation of move keys 114a to 114h in a soft key menu 114. When the cursor is moved, the part 111 shows a side view of the lens such that the cursor 113a is always positioned at the center of the view.

The plan view 113 shows a line 113b connecting the cursor 113a and the center 113e of the frame rim, a location 113c of maximum edge thickness, and a location 113d of minimum edge thickness. The line 113b may alternatively connect the cursor 113a to the lens axis, instead of the center 113e of the rim. Further, another cursor may be displayed on the screen such that a line connecting this cursor to the cursor 113a is shown. Thus, a sectional view taken along any desired line can be displayed for confirmation, as described later.

The move keys 114a and 114b are used to cause the cursor 113a to jump to the locations 113c and 113d of maximum and minimum edge thicknesses, respectively. The move keys 114c to 114f are used to cause the cursor 113a to jump to the 0-degree positions of the vertical and horizontal axes of the plan. The move keys 114g and 114h are used to move the cursor 113a by 10 degrees clockwise and counterclockwise, respectively.

After the position of the cursor 113a is determined through operation of the soft keys, a fix key 114i is selected, whereby a sectional view (112) taken along the line 113b is displayed in the lower right part of the screen. Thus it is possible to closely view the lens shape, as well as the relationship between the edge and bevel positions.

In addition to above-discussed, numerical data also is displayed as shown in FIG. 11. Specifically, the angular position of the cursor 113a is indicated in terms of the direction of section, below the plan view 113. In the illustrated example, the angle indication used in the boxing system is shown. Below the sectional view 112, the edge thickness along the sectioned plane, a forward shift amount, and a ratio are shown. The forward shift amount is the distance between the front refracting surface of the lens to the rear bottom of the bevel, and the ratio is the ratio of the distance between the front refracting surface of the lens and the vertex of the bevel to the edge thickness.

At the spectacle store 100, the front curve or edge thickness of the lens is determined through the screen, and then it is altered if necessary.

In order to return to the initial screen, a resume key 114j is selected.

[S144] When the bevel balance display key 91c in FIG. 9 is selected, a balance of the right and left bevels is displayed.

FIG. 12 illustrates an example of the right-left bevel balance displayed at the display device. The figure shows the bevel balance of the combination #1 in FIG. 9. The bevel balance view shows locations of various parts of the right and left lenses (i.e., the front refracting surfaces 120a and 120f, bevel vertexes 120b and 120g, rear refracting surfaces 120c and 120h, front bottoms 120d and 120i and rear bottoms 120e and 120j of the bevels) in a continuous manner and in the form of a strip in the range from 0 to 360 degrees. In the illustrated example, for the right lens, the angle indication used in the boxing system is shown, and for the left lens, the angle indication is opposite to that of the boxing system. Namely, in both the right and left lenses, zero degree denotes a point at which a horizontal axis passing the center of the rim or the lens axis crosses the nose side of the rim. The positive (+) direction of angle indication denotes the counterclockwise direction for the right lens, and the clockwise direction for the left lens.

FIG. 12 shows the bevel balance of lenses which have been processed according to the front curve tracing. Accordingly, the front refracting surfaces 120a and 120f of the right and left lenses overlap the front bottoms 120d and 120i of the bevels, respectively.

Also, the locations 121 and 124 of maximum edge thicknesses and the locations 122 and 125 of minimum edge thicknesses of the right and left lenses are indicated. Cursors 123 and 126 can be moved through operation of move keys 129a to 129d of a soft key menu 129. The move key 129a is used to cause the cursors 123 and 126 to jump to the maximum-thickness locations 121 and 124, respectively, and the move key 129b is used to cause the cursors 123 and 126 to jump to the minimum-thickness positions 122 and 125, respectively. The move keys 129c and 129d, when operated, move the cursors 123 and 126 in the directions of the corresponding arrows by 10 degrees.

Further, contours 127 and 128 of edge surfaces at which the cursors 123 and 126 are positioned are displayed below the right and left bevel balance views, respectively. Also, numerical data relating to the contours (i.e., the direction of section, edge thickness, forward shift amount, and ratio) is shown. For example, with regard to the right lens, the direction of section at the contour 127 is zero degree, the edge thickness is 3.4 mm, the forward shift amount of the bevel bottom is 0.0 mm, and the ratio of the distance between the front refracting surface of the lens and the bevel vertex to the edge thickness is 40%.

The balance view displayed in this manner allows the operator to view the relationships between the edge and bevel positions of the right and left lenses at a time. This provides the advantageous effects described below. When a mode other than the front curve tracing is specified in Step S3 of FIG. 2, and if the right and left lenses must be processed according to different prescription values or be laid out differently or the right and left rims of the frame have different curves, care must often be given to the balance of the right and left bevel positions. When the front curve tracing mode is specified, the bevel position can be easily predicted because the bevel is formed so as to adjoin the front edge of the lens, and situations where the bevel position of the finished spectacles is improper do not arise.

In modes other than the front curve tracing, the edge thickness of lens and the rim curve of frame are factors in determining the bevel position. Conventionally, therefore, it was difficult to predict bevel positions of right and left lenses of finished spectacles. According to the present invention, the bevel position can be predicted, and also the balance of right and left bevel positions can be confirmed in advance. Thus, it is possible to provide spectacles with right and left bevel positions being well balanced.

The accuracy in determining whether the bevel position is proper or not depends on the skill of technicians. Since the relationship between the edge position and bevel position of both the right and left lenses can be viewed at a time, as shown in FIG. 12, technicians can readily confirm the state in which lenses are set in a frame. It is, therefore, possible to provide good-looking spectacles.

In order to return to the initial screen, a resume key. 129e is selected.

In viewing the screens shown in FIGS. 11 and 12, if the operator at the spectacle store 100 judges that the edge and bevel positions are poorly balanced, the beveling mode set in Step S3 of FIG. 2, lens type, or front curve of the lens may be changed.

[S145] This step is executed when error has occurred in the bevel process/design calculation performed in Step S12 of FIG. 3. Specifically, the message "ERROR OCCURRED" is displayed at the display device of the terminal computer 101 shown in FIG. 1. The contents of the error relating to the beveling can be displayed by selecting an "ERROR DISPLAY" soft key.

Errors that could occur in the beveling are as follows: First, interference may occur during the beveling. For example, in the case of a small frame, such as a frame for half glasses having a decorative part at each end, a jig for fixing the lens may interfere with a machine during the beveling. If such an error occurs, a larger frame need to be specified so that an order may be accepted.

Secondly, an error may arise in the case where the frame must be bent to allow a bevel to be formed around the entire periphery of a lens, though Step S3 requires that the frame should not be bent. When such an error occurs, a lens having a front curve matching the frame shape must be selected.

Thirdly, error may arise in the case where the frame must be bent significantly, though the beveling itself can be carried out on the lens. In the case of such an error occurring, after checking to see if the beveling mode specified is in error or improper, a different beveling mode need to be specified or the front curve of the lens need to be changed so as to be close to the frame shape.

[S146] This step is executed when an error indicating deficiency of the outer diameter or edge thickness of the lens arises during the lens process/design calculation carried out in Step S11 of FIG. 3. In this case, the message "CUTTING FAILED" is displayed at the display device. On selecting a "LAYOUT DISPLAY" soft key, an error indication screen is displayed.

Figure 13:
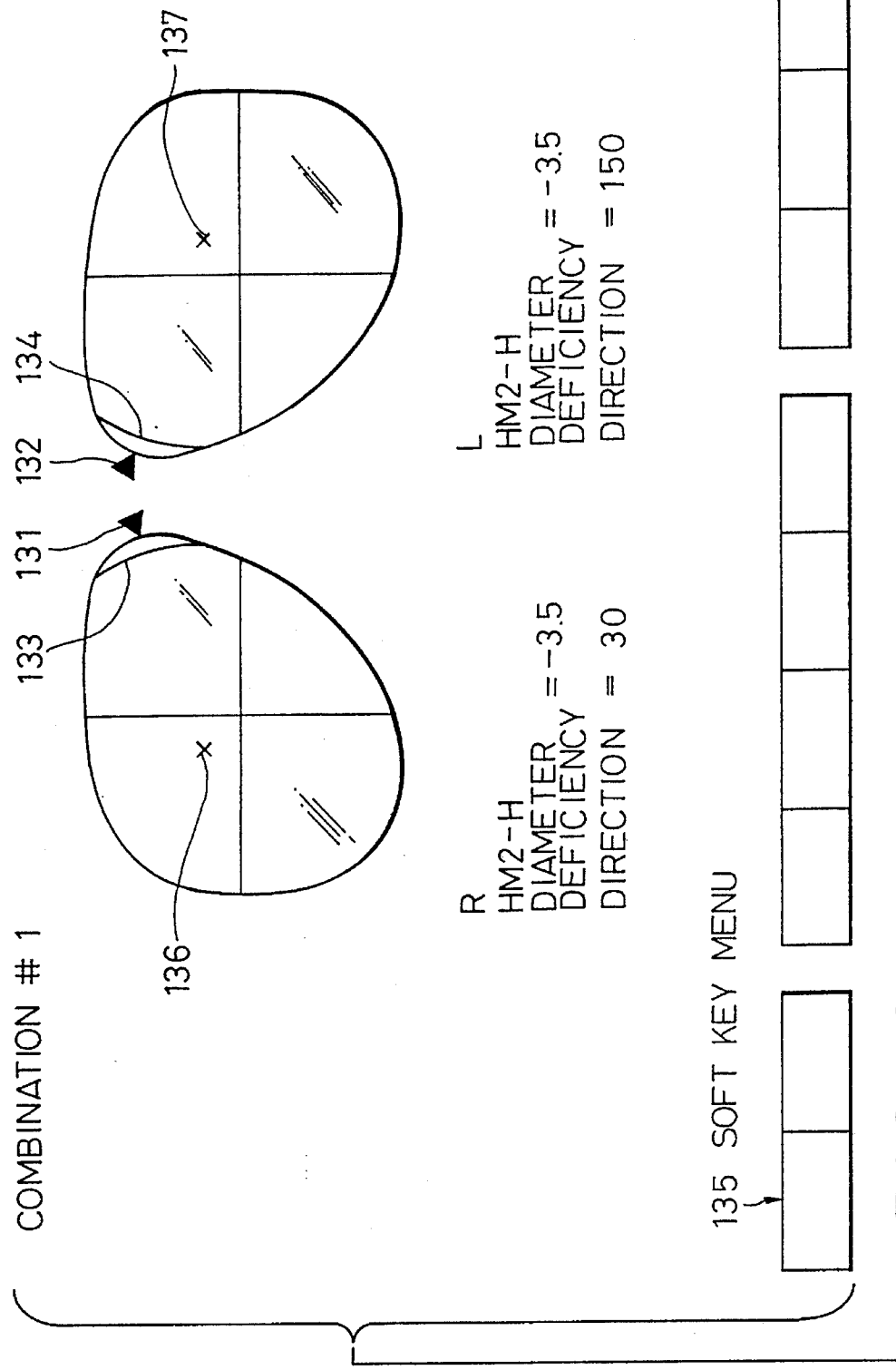
FIG. 13 is an example of an error indication displayed on the display device.

FIG. 13 illustrates an example of the error indication screen displayed at the display device. In the illustrated example, the combination #1 shown in FIG. 9 is displayed. Also, locations of maximum deficiencies of the outer diameter are indicated by cursors 131 and 132, and actual contours 133 and 134 of the lenses are displayed. Further, eyepoints 136 and 137 of the lenses are indicated on the screen. In the lower part of the screen, numerical data representing the deficiencies of the outer diameter and the directions of deficiency is shown, thereby allowing the operator to check the contents of the error. When this type of error occurs, another lens type with a greater outer diameter or a smaller frame need to be specified.

A resume key 135a in a soft key menu 135 is selected to return to the initial screen.

Description will be continued in reference again to FIG. 3.

[S15] If "ORDER" was specified in Step S9 of FIG. 2, this step is executed, wherein it is determined whether an error has occurred in the process/design calculations carried out in Steps S11 and S12 of FIG. 3. If an error has occurred, information representing the occurrence of the error is transmitted to the terminal computer 101 at the spectacle store 100 through the public communication line 300, and the program proceeds to Step S17. In the absence of error, information representing non-occurrence of an error is transmitted to the terminal computer 101 at the spectacle store 100 via the public communication line 300, and the program proceeds to Step S16, and then to Step S18 and the subsequent steps (FIG. 4) to carry out an actual process.

[S16] The message "ORDER ACCEPTED" is displayed at the display device of the terminal computer 101 at the spectacle store 100, whereby the operator can ascertain that an order has been placed for unedged or beveled lenses that can be set in the frame without fail.

[S17] The message "ORDER REJECTED" is displayed, since an error has occurred during the lens or bevel process/design calculation and the lens ordered cannot be processed.

Figure 4:
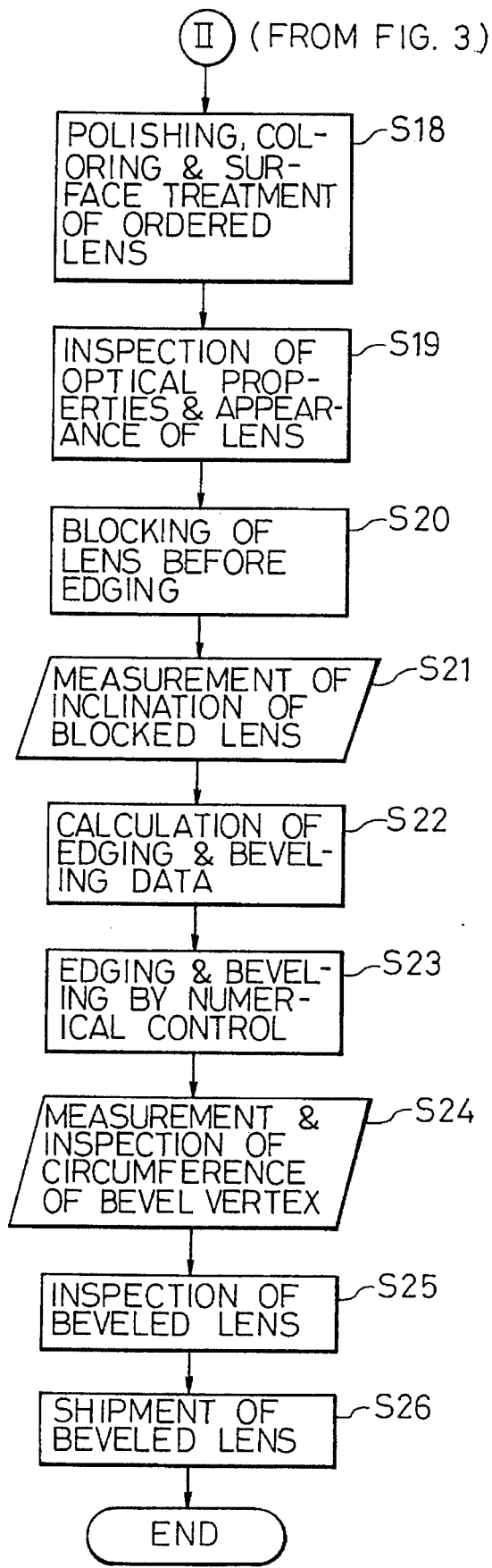
FIG. 4 is a flow chart of an actual process carried out in the factory, including a rear-surface polishing, edging, and beveling of lenses.

FIG. 4 is a flow chart showing the actual process carried out at the factory 200 for the rear-surface polishing, edging, beveling, etc. of lenses. Numbers following "S" represent step numbers. In the following, the process will be explained also in reference to FIG. 1.

[S18] This step is executed when "ORDER" has been specified in Step S9 and at the same time no error has occurred during the lens or bevel process/design calculation. Specifically, the results of the lens process/design calculation in Step S11 are previously supplied to the terminal computer 210 shown in FIG. 1, and the rear curves of lenses are finished by the rough edger 211 and the sand polisher 212 in accordance with the results of the calculation supplied thereto. Further, coloring, surface treatment, and other steps preceding the edging are carried out by various machines, not shown. This step is skipped in the case where a lens in stock has been specified.

[S19] The spectacle lenses which have been subjected to the steps preceding the edging, in Step S18, are inspected for optical properties and appearance. In order to carry out this inspection, the terminal computer 220, the lens meter 221, and the thickness gauge 222 shown in FIG. 2 are used, and a three-point mark indicating the lens axis is put on each lens. In the case where the order from the spectacle store 100 is for unedged lenses, the lenses are shipped to the spectacle store 100 after the quality inspection.

[S20] Based on the results of the calculation in Step S12, the blocking jig for holding the lens is fixed at a predetermined position relative to the lens by using the terminal computer 230, the marker 231, the image processor 232, etc. shown in FIG. 1. Specifically, the image processor 232 operates to obtain an image of the front surface of the spectacle lens by means of a TV camera, display the obtained image on a CRT screen, and to superimpose a layout mark image of unedged lens on the obtained image. In this case, the lens position is adjusted such that the three-point mark on the lens coincides with the layout mark image displayed on the CRT screen, to thereby determine the position at which the blocking jig is to be fixed. Then, using the marker 231, a blocking mark at which the blocking jig is to be fixed is painted on the lens. The blocking jig is fixed to the lens at the blocking mark.

[S21] The lens fixed to the blocking jig is mounted to the lens grinding machine 241 shown in FIG. 1. In order to recognize the position (inclination) of the lens mounted to the lens grinding machine 241, at least three points previously specified with respect to the front or rear surface of the lens are measured. The values measured are stored to be used in the calculation in the subsequent Step S22.

[S22] The mainframe 201 shown in FIG. 1 performs calculation similar to the bevel process/design calculation in Step S12. In practice, however, there may arise an error between the calculated lens position and an actual lens position. Such an error is compensated for after completion of the coordinate transformation into the processing coordinate system. Namely, based on the values of the three points measured in Step S21, the error between the lens position recognized by the calculation and the actual lens position is corrected. For the remaining part, the calculation performed in this step is identical to the bevel process/design calculation carried out in Step S12, whereby a final three-dimensional figure of the bevel edge is calculated.

Then, based on the calculated three-dimensional figure of the bevel edge, data representing a three-dimensional processing path with reference to the processing coordinate system, which is used when grinding the lens with a grindstone having a predetermined radius, is calculated.

This step will be explained in detail later following Step S12, with reference to FIG. 29.

[S23] The processing path data calculated in Step S22 is supplied to the NC lens grinding machine 241 through the terminal computer 240. The lens grinding machine 241 is an NC (numerically controlled) grinding machine, which has a rotatable grindstone whose position is controlled along a Y axis (perpendicular to the spindle axis) for edging and beveling lenses, and which is at least capable of three-axis control including the control of the angle of rotation (rotational direction of the spindle axis) of the blocking jig for fixing lenses, and a Z-axis control by which movement of the grindstone or lens along a Z axis (along the spindle axis) is controlled. The machine 241 carries out edging and beveling of lenses in accordance with data supplied thereto. Instead of the lens grinding machine 241 having a grindstone for grinding lenses, a cutting machine including a cutter for cutting lenses may be used.

[S24] The circumference and figure of the bevel vertex of the beveled lens are measured by the terminal computer 250 and the shape measuring apparatus 251. Specifically, the lens, which has been subjected to the process of Step S23, is attached to the shape measuring apparatus 251 while being fixed to the blocking jig, then the probe for measuring the bevel vertex is disposed into contact with the bevel vertex, and the measurement is started. The measured values are supplied to the terminal computer 250 and displayed at the display device.

The terminal computer 250 compares the design circumference of the bevel vertex, calculated in Step S12, with the measured value, obtained by the shape measuring apparatus 251, and if the difference between the design circumference and the measured circumference is not greater than, e.g., 0.1 mm, the lens is regarded as an acceptable lens.

Further, the design size, A by B, of the frame, calculated in Step S12, is compared with the measured size A by B, obtained by the shape measuring apparatus 251. If the difference between the design size and the measured size is not greater than, e.g., 0.1 mm, the lens is regarded as an acceptable lens.

[S25] The bevel figure including bevel position of the beveled lens is compared against a drawing, which indicates the bevel position and is included in a process instruction sheet prepared based on the calculation in Step S12, to inspect the bevel quality. Also, the appearance of the lens is checked to see if a flaw, burr, crack or the like is produced during the edging step.

[S26] The beveled lens thus finished is shipped to the spectacle store 100.

In the above embodiment, the predicted shape of a beveled lens is displayed on screen to allow the operator to confirm a finished shape. It is, however, not essential to display the predicted shape of a beveled lens on screen, and information as to whether the lens process including the beveling can be carried out on a lens may be displayed. Namely, although it is desirable to display character data representing the contents of error, one-bit information as to whether the lens process is possible or not may be displayed instead.

As described above, based on the spectacle lens information, frame information, and prescription values supplied from a lens order side, the processor side calculates a desired lens shape including the bevel figure, and provides the person with information as to whether the lens process (including the beveling) is possible based on the results of the calculation. The received information is displayed on screen at the person ordering, whereby the orderer is informed as to whether the lens process including the beveling is possible or not. Accordingly, whether the lens process including the beveling is possible or not can be determined in advance, and based on this information, the lens to be used may be finally determined or an optimum bevel may be set.

Further, a predicted shape of finished lenses (including bevel shapes) is displayed for confirmation, thus making it possible to finally determine the lens to be used or to set an optimum bevel. Since not only the edge of the lens but the entire shape of the lens is displayed, a desired lens type can be selected and a proper bevel position can be set. Furthermore, it is possible to determine whether the lens type and various processing values are suited for the frame used, before the lens is actually ordered.

After confirming the information on screen, the person ordering may request the processor side (manufacturer) to ship unedged lenses so that the lenses may be edged and beveled on the order side. Even in such a case, the person ordering can accurately place an order for spectacle lenses that match the prescription and the frame.

In the case of placing an order with the processor side (manufacturer) for beveled lenses that fit a frame which the person ordering has, such person ordering may keep the frame at hand. Thus, labor associated with the lens process can be eliminated, thereby making it possible to supply spectacles without the need for good knowledge of spectacles or skill of the lens process.

Figure 14:
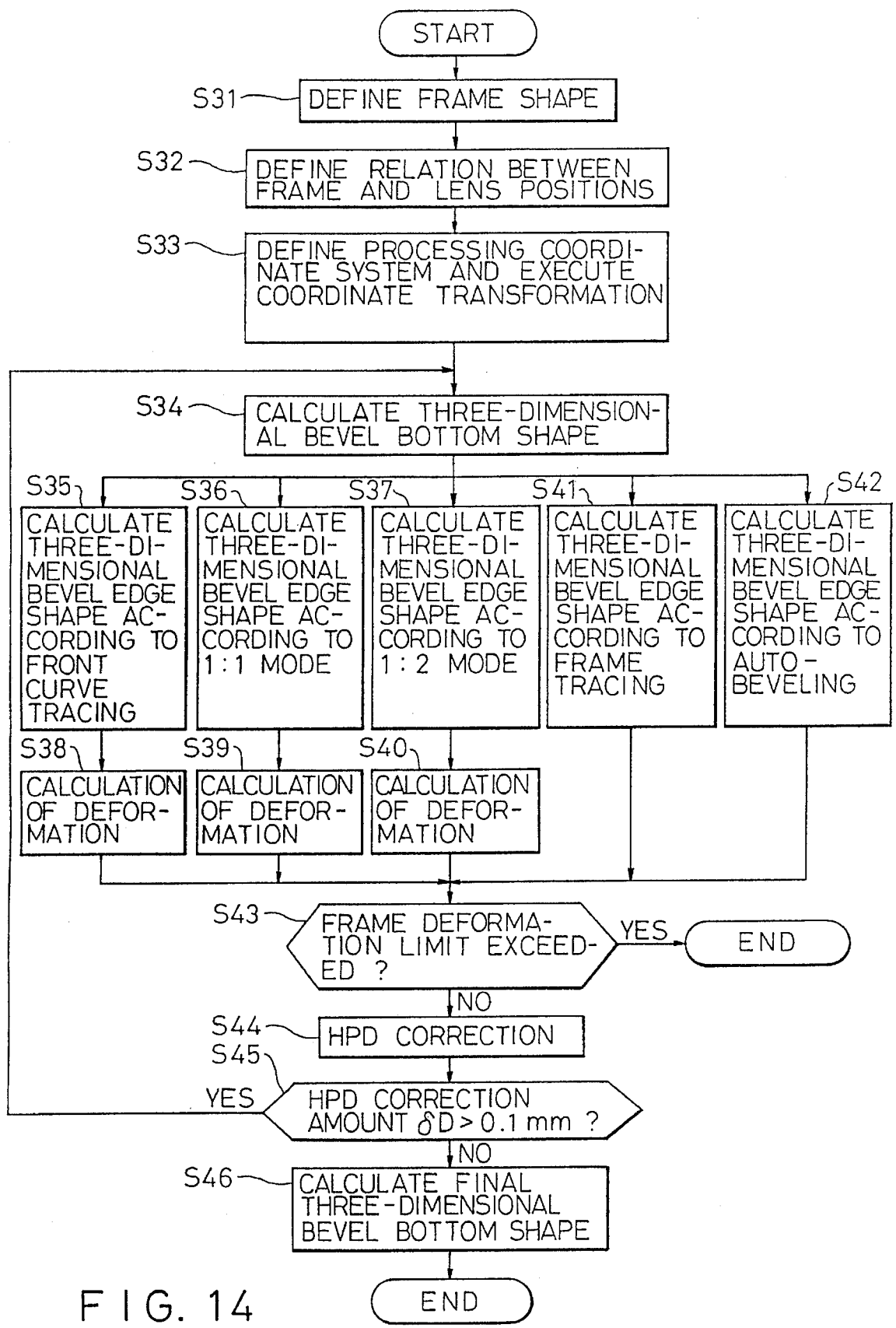
FIG. 14 is a flow chart showing details of Step S12 in FIG. 3.

Now, Step S12 mentioned above will be described in detail with reference to FIG. 14, which is a flow chart showing details of Step S12. In the chart, numbers of following "S" represent step numbers.

[S31] When the polar coordinates (Rn, θn) (n=1, 2, ..., N) representing a radius vector and a direction thereof, coordinates (a, b, c) of the center of the torical surface, base radius RB, cross radius RC, and unit vector (p, q, r) in the direction of the axis of rotation symmetry of the torical surface are supplied from the terminal computer 101 in FIG. 1 as data representing the three-dimensional shape of the frame, orthogonal coordinates (Xn, Yn, Zn) (n=1, 2, ..., N) representing the three-dimensional frame shape are computed. This will be explained with reference to FIG. 15. Although the following description is based on the assumption that the frame rim has a shape congruent to a torical surface, the present invention is applicable to frame rims whose shape is congruent to a spherical surface.

FIG. 15 is a perspective view illustrating the relationship between individual constants associated with a torical surface and orthogonal coordinates. Of the orthogonal coordinates (Xn, Yn, Zn) representing the three-dimensional shape of the frame rim, two-dimensional orthogonal coordinates (Xn, Yn) are obtained by transforming the polar coordinates (Rn, θn) into corresponding orthogonal coordinates, while Zn is given as the Z-axis coordinate at (Xn, Yn) on the given torical surface. In this case, the data supplied from the terminal computer 101 is data representing the shape of the frame rim in a state in which the front of the frame coincides with the Z axis.

Subsequently, based on the obtained orthogonal coordinates (Xn, Yn, Zn) (n=1, 2, ..., N) representing the three-dimensional frame rim shape, a circumference FLNK of the frame rim, which is the length of the periphery of the reproduced three-dimensional frame rim shape, is calculated according to the following equation (2):

$$FLNK = \Sigma[\{(X_i - X_{i+1})^2 + (Y_i - Y_{i+1})^2 + (Z_i - Z_{i+1})^2\}^{1/2}] (i=1 \ldots N) \quad (2)$$

In the equation (2), when i=N, "1" is used for (i+1).

The circumference FLN of the bevel groove, which is an actual measured circumference of the frame rim based on the three-dimensional measurement values relating to the frame rim shape, is already supplied from the terminal computer 101 (cf. Step S6), and thus a ratio (=FLN/FLNK) of the circumferences is calculated to obtain a coefficient k.

The coefficient k corresponds to an error associated with the reproduction of the three-dimensional frame rim shape, and therefore, the orthogonal coordinates (Xn, Yn, Zn) (n=1, 2, ..., N) representing the frame rim shape are individually multiplied by the coefficient k to correct the error. Specifically, the frame rim shape before correction is a shape reproduced on the assumption that the individual points on the frame rim all lie on the torical surface, but in some cases, part of the original frame rim shape may not be situated on the torical surface, and such part cannot be specified by the given data. Correcting the reproduced frame rim shape by using the circumference of the original frame rim shape makes it possible to design spectacle lenses that fit the frame. Description will be continued with reference to FIG. 16.

Figure 16:
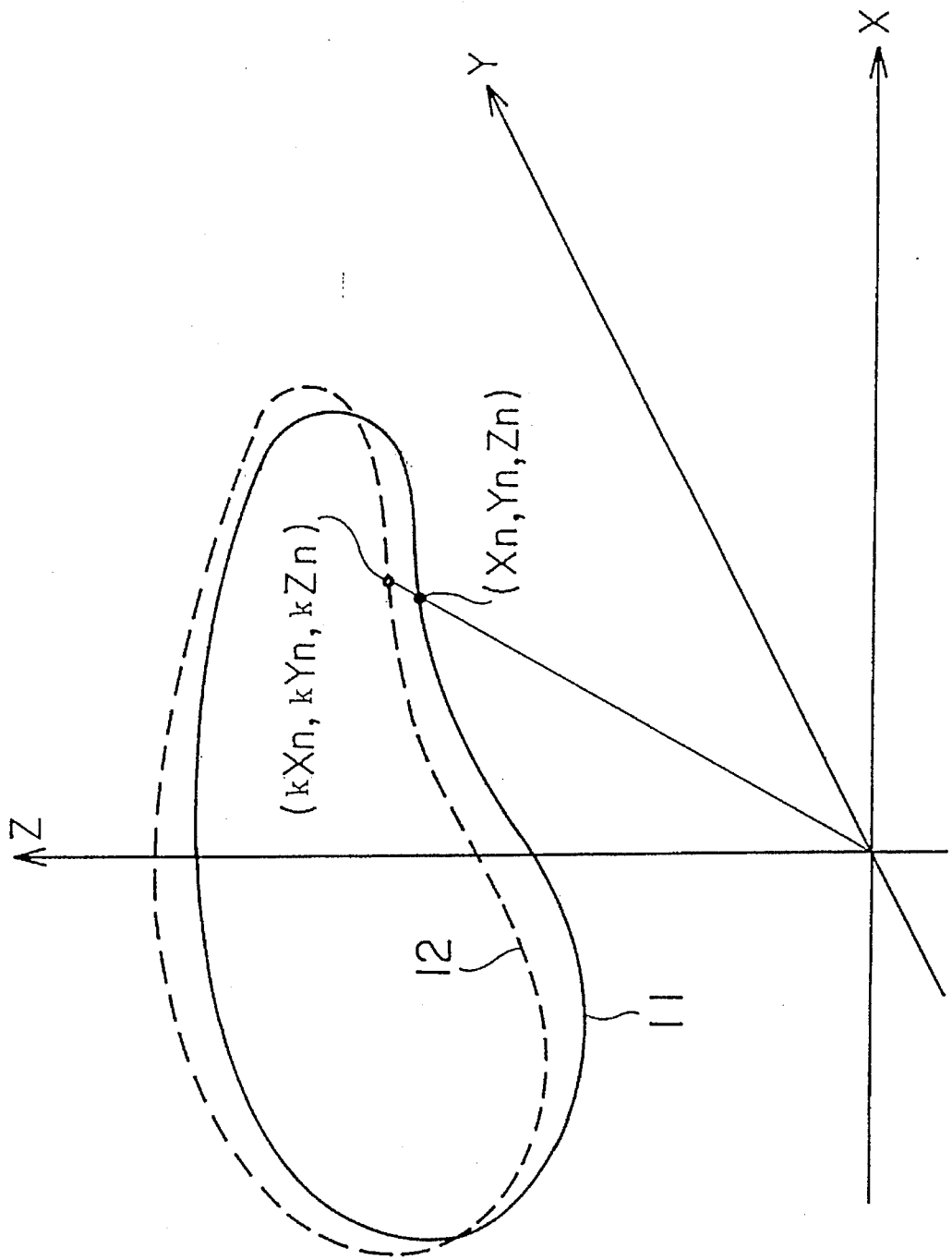
FIG. 16 is a perspective view showing a rim shape which is obtained by correcting orthogonal coordinates (Xn, Yn, Zn) representing the frame shape by using a coefficient k.

FIG. 16 is a perspective view illustrating a frame rim shape obtained by correcting the orthogonal coordinates (Xn, Yn, Zn) representing the frame rim shape by using the coefficient k. As illustrated, the orthogonal coordinates (Xn, Yn, Zn) representing the frame rim shape are individually multiplied by the coefficient k, thus obtaining coordinates (kXn, kYn, kZn) representing a new, corrected frame rim shape 12. The corrected coordinates are used as the coordinates (Xn, Yn, Zn) (n=1, 2, ..., N) representing the frame rim shape.

Further, a circumference correction coefficient CF, which is preset for each of frame materials, is read and used to correct the coordinates (Xn, Yn, Zn), as in the case of the coefficient k. This correction is intended mainly for absorbing an error attributable to the expansion or contraction of the frame material.

Instead of the aforementioned correction method based on the multiplication of coefficients, error may be partially accumulated or be added up, and the latter method may be used for the present invention.

The calculations described above are carried out with respect to the right and left rims of the frame.

[S32] The relation of the lens position to the frame position is determined. This will be explained with reference to FIG. 17.

Figure 17:
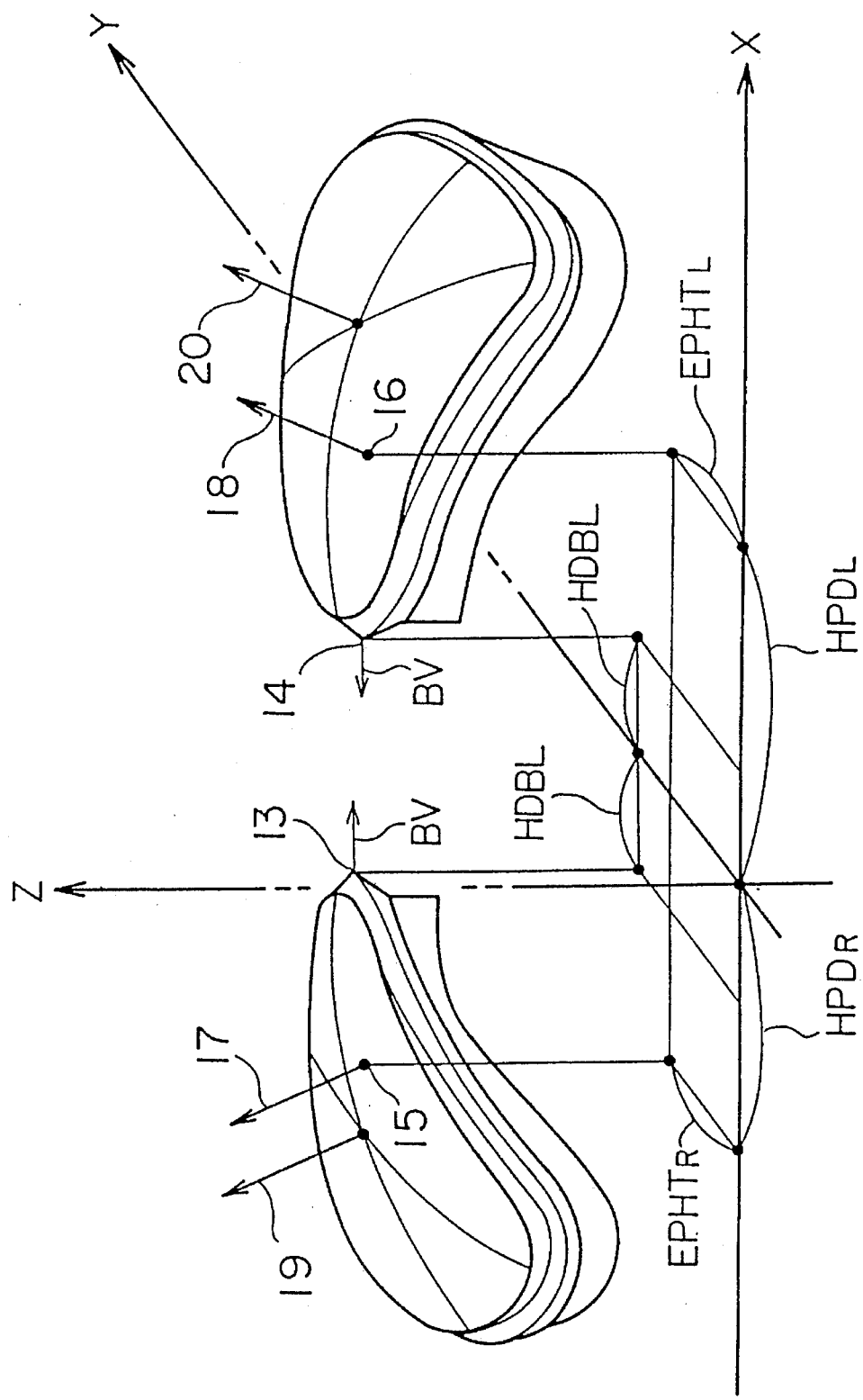
FIG. 17 is a perspective view of right and left lenses placed according to the frame positioning.

FIG. 17 is a perspective view illustrating right and left lenses positioned with reference to the frame position. First, a "frame coordinate system" is established, wherein an X axis coincides with a datum line or horizontal reference axis of the spectacles, a Y axis coincides with the vertical direction of the spectacles, and a Z axis coincides with a line perpendicular to the front of the spectacles. Then, two sets of the coordinates, (Xn, Yn, Zn) (n=1, 2, ..., N), representing the respective shapes of the two frame rims and having their own geometric center as an origin, obtained in Step S31, are defined with reference to the frame coordinate system.

Specifically, the two sets of coordinates (Xn, Yn, Zn) (n=1, 2, ..., N) representing the frame rim shapes are subjected to parallel displacement such that respective X-axis coordinates at points 13 and 14 closest to the nose (most inward points of the rims) coincide with –HDBL and HDBL, respectively (HDBL is half the inter-rim distance DBL supplied from the terminal computer 101; cf. Step S6).

The coordinates representing the shapes of the two frame rims, which have been subjected to the parallel displacement, are then rotated about a straight line passing the points 13 and 14 and parallel to the Y axis through the angle TILT (cf. Step S6), which is supplied from the terminal computer 101 as the angle between the front directions of the spectacles and of the frame rim.

Subsequently, the position and orientation of the individual lenses with respect to the three-dimensional frame shape thus defined with reference to the frame coordinate system are determined by specifying the eyepoints 15 and 16 and directions 17 and 18 of normal lines normal to the respective front surfaces of the lenses at the eyepoints.

The eyepoints 15 and 16 represent points on the front surfaces of the respective lenses corresponding to the centers of the wearer's pupils when the spectacles are worn, and are previously input in Step S3 as the layout information relating to the right and left lenses, i.e., a horizontal distance HPD between the center of the wearer's nose and the center of the corresponding pupil, and a vertical distance EPHT between the datum line and the center of the corresponding pupil. Specifically, as the HPD and EPHT data associated with the right and left lenses, $HPD_L$, $HPD_R$, $EPHT_L$ and $EPHT_R$ are previously entered. Accordingly, based on $HPD_L$, $HPD_R$, $EPHT_L$ and $EPHT_R$, XY coordinates of the eyepoints 15 and 16 are determined respectively as ($-HPD_R$, $EPHT_R$) and ($HPD_L$, $EPHT_L$). For the Z-axis coordinates of the eyepoints 15 and 16 and the directions 17 and 18 of the normal lines normal to the front surfaces of the lenses at the respective eyepoints, the bevel position is already determined in the case of an ordered lens with its bevel position having been specified. However, in the case where the bevel position is not specified, the Z-axis coordinates of the eyepoints and the directions of the normal lines cannot be determined because the bevel position is not yet specified. In this case, the points 13 and 14 are temporarily regarded as representing the front surfaces of the respective lenses, and the Z-axis coordinates of the eyepoints are determined based on the points 13 and 14. Further, the eyepoints 15 and 16 and the directions 17 and 18 of the normal lines normal to the front surfaces of the lenses at the respective eyepoints are determined such that the directions 17 and 18 of the normal lines coincide with the front of the respective frame rims.

The direction of the nose-width distance DBL, which is the distance between the rims, is defined by a unit vector BV. Namely, the unit vector BV is parallel to the X axis and is directed from the right or left ear toward the nose.

[S33] In the following, a point which is used as a reference when holding the lens for beveling is called processing origin, and a direction perpendicular to the direction of the bevel edge is called the direction of a processing axis. In this step, a "processing coordinate system" is established, wherein an origin coincides with the processing origin and a Z axis coincides with the processing axis, and the three-dimensional frame shape data and three-dimensional lens position data, obtained Step S32, are transformed into corresponding data with reference to the processing coordinate system.

The processing origin can be set at any desired point, but in the following, it is assumed that the processing origin is set at a point at which a straight line passing the geometric center of the rim (i.e., the frame center) and parallel to the front of the frame crosses the front surface of the lens located at the position set in Step S32. The direction of the processing axis differs depending upon how the lens is held, and in the case where the front surface of the lens is used as a reference, for example, the direction of the normal line normal to the front surface of the lens at the processing origin may be set as the direction of the processing axis. The three-dimensional frame shape data, three-dimensional lens position data and unit vector BV in the direction of the nose width, defined in Step S32 with reference to the frame coordinate system, are transformed into corresponding data with reference to the processing coordinate system established as above.

In the following, the ridge line of the bevel is called bevel edge, and the bottom of the root of the bevel is called bevel bottom. The three-dimensional frame shape data represents the locus of the bevel edge, and thus is hereinafter called three-dimensional bevel edge figure as defined by coordinates (Xbn, Ybn, Zbn) (n=1, 2, . . . , N).

[S34] First, based on a two-dimensional bevel edge figure obtained by projecting the locus of the bevel edge onto the XY plane of the processing coordinate system, a two dimensional bevel bottom figure, which is a projection of the locus of the bevel bottom onto the XY plane along the Z axis of the processing coordinate system, is obtained. This step will be described with reference to FIG. 18.

Figure 18:
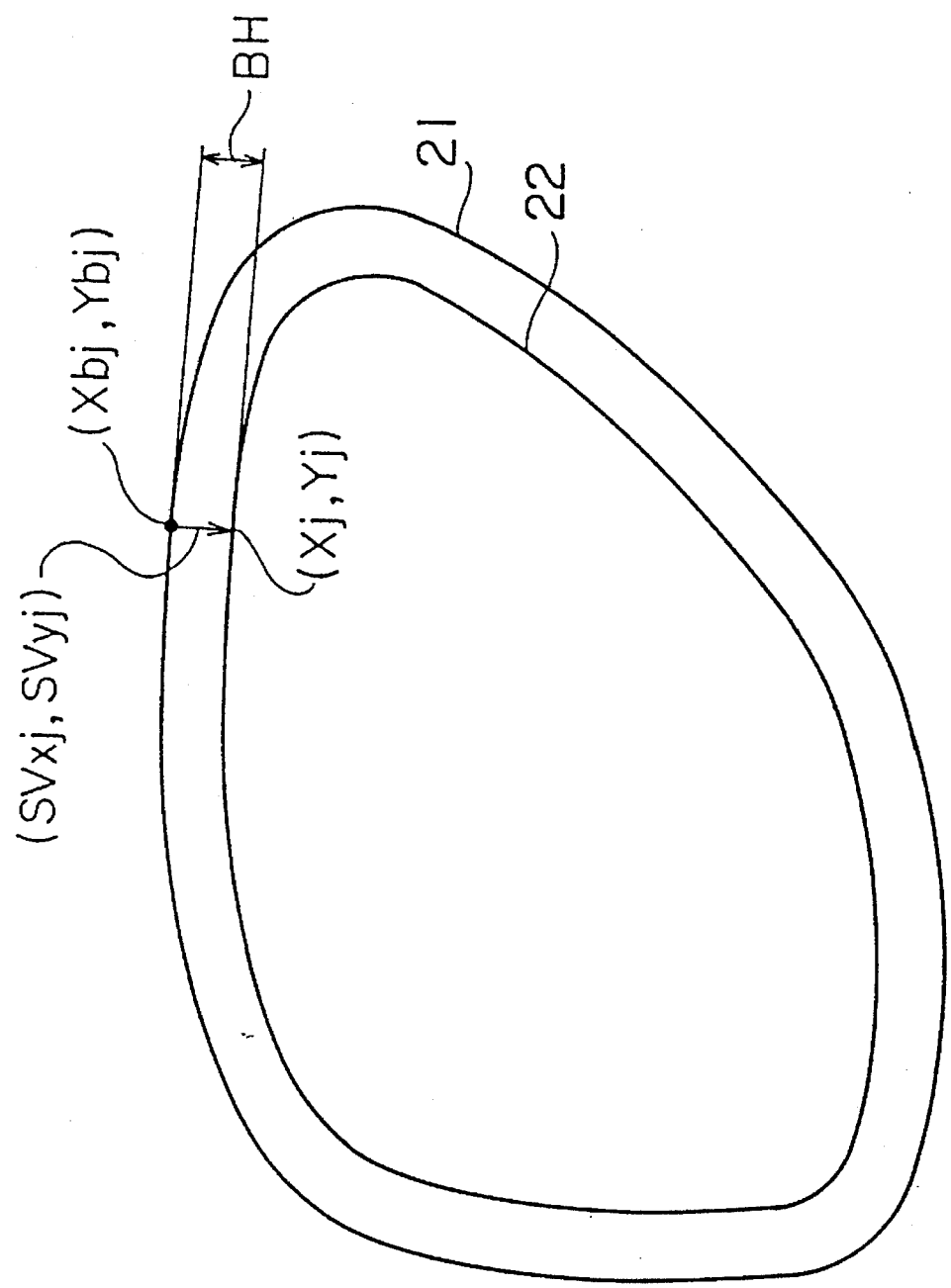
FIG. 18 is a plan view showing an edge and bottom of a bevel projected onto an XY plane.
Figure 21:
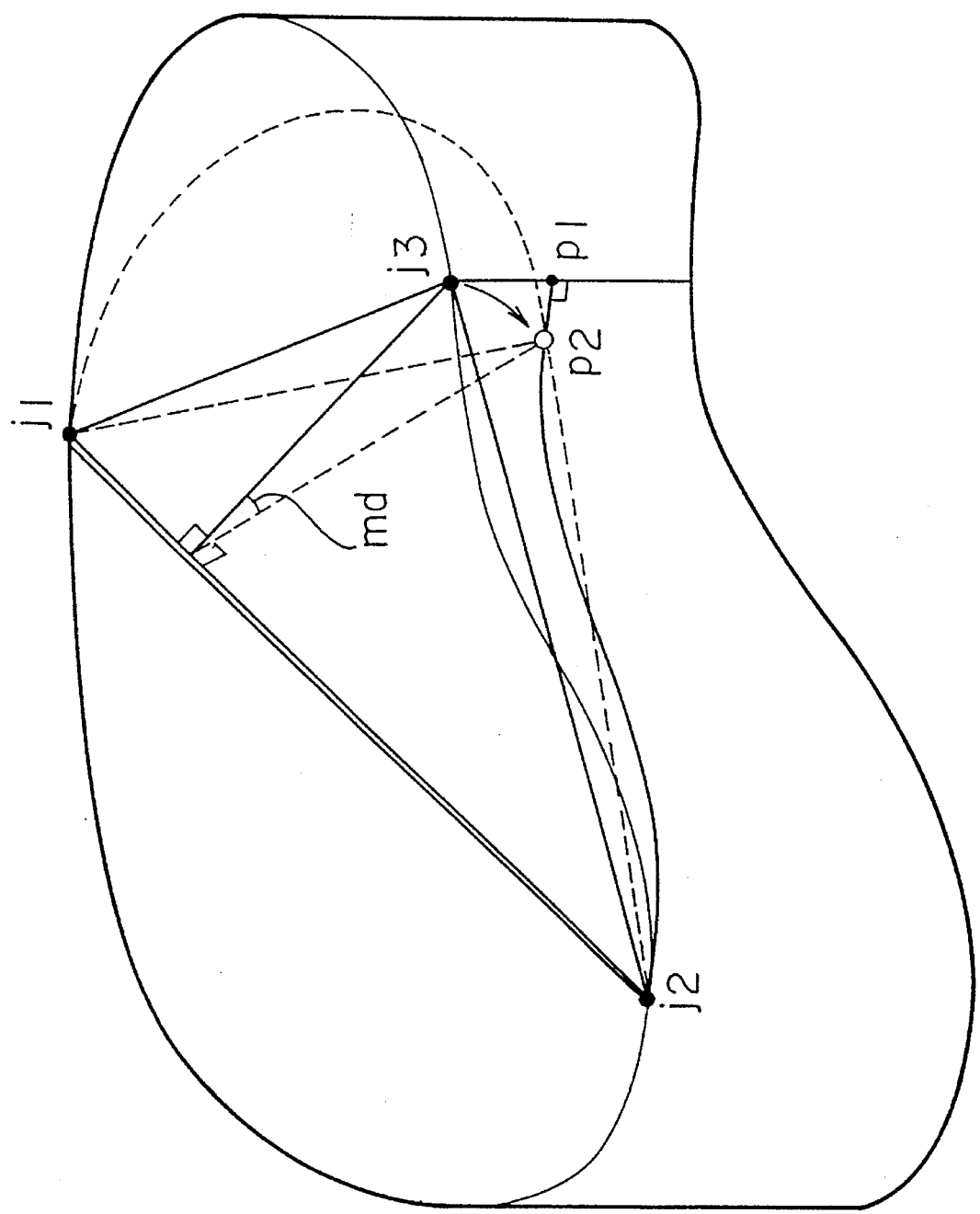
FIG. 21 is a perspective view illustrating an angle of rotation.
Figure 22:
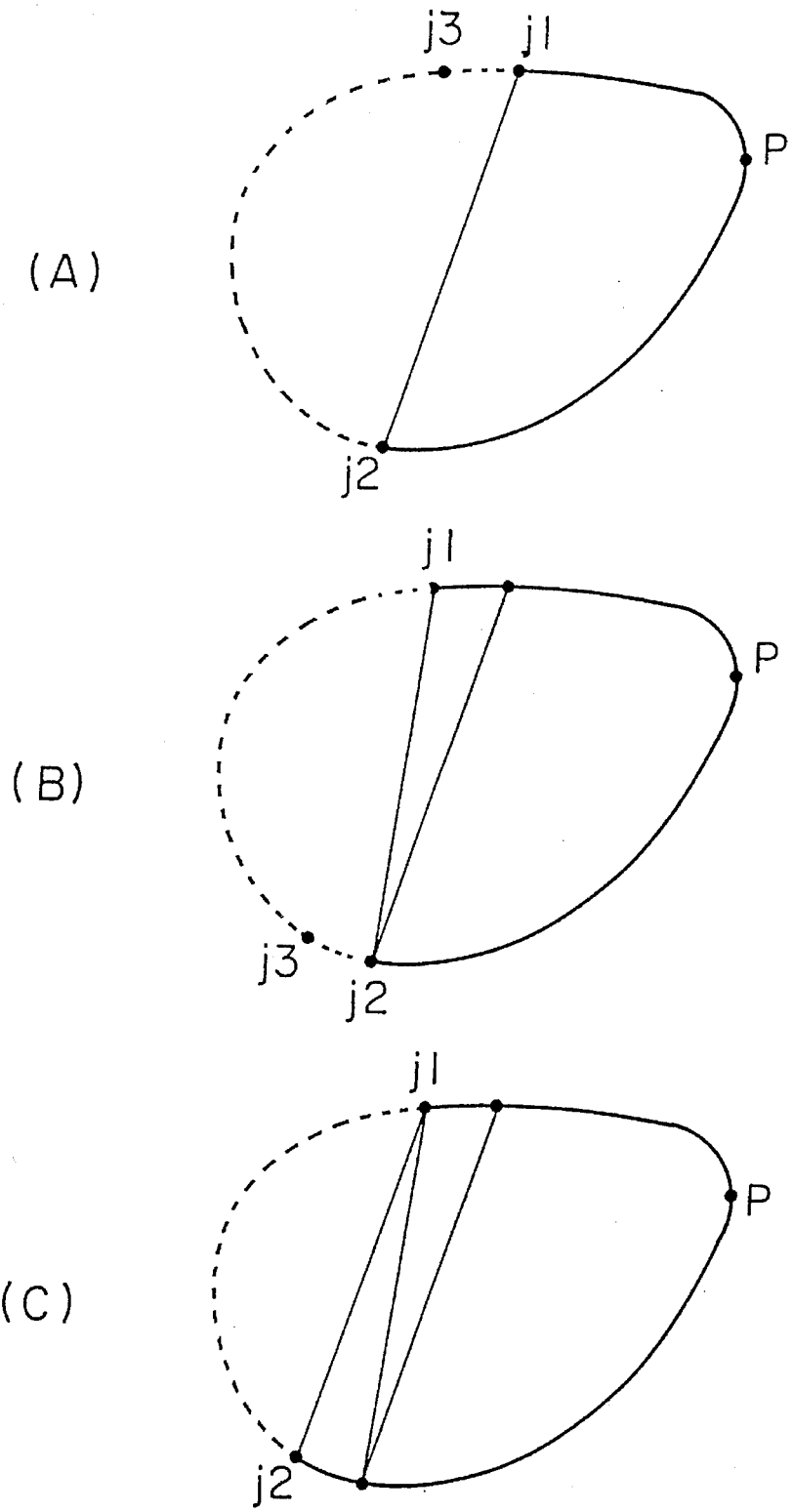
FIGS. 22(A), (B) and (C) are plan views where (A) shows a three-dimensional figure of the bevel edge projected onto the XY plane, observed in a first stage of a latter half of the deformation process;(B) is a plan view showing a three-dimensional figure of the bevel edge projected onto the XY plane, observed in a second stage of the latter half of the deformation process; and (C) is a plan view showing a three-dimensional figure of the bevel edge projected onto the XY plane, observed in a third stage of the latter half of the deformation process.

FIG. 18 is a plan view showing a bevel edge figure and bevel bottom figure projected onto the XY plane. The two-dimensional bevel bottom FIG. 22 is a shape obtained by shifting the two-dimensional bevel edge FIG. 21 in the direction of the normal line of the shape 21 by the bevel height BH. Thus, provided the coordinates of the two-dimensional bevel edge FIG. 21 are (Xbn, Ybn) (n=1, 2, . . . , N), the coordinates of the two-dimensional bevel bottom FIG. 22 are (Xn, Yn) (n=1, 2, . . . , N), and the normal vector at the jth point (Xbj, Ybj) on the two-dimensional bevel edge figure is (SVxj, SVyj), then the corresponding coordinates (Xj, Yj) of the two-dimensional bevel bottom FIG. 22 can be obtained by adding the normal vector (SVxj, SVyj) to (Xbj, Ybj). The coordinates (Xn, Yn) (n=1, 2, . . . , N) of the two-dimensional bevel bottom FIG. 22 are calculated for j=1 through to j= N.

Then, based on the front and rear curves of the lens, determined in Step S11, and the coordinates (Xn, Yn) (n=1, 2, . . . , N) of the two-dimensional bevel bottom figure, Z-axis coordinates Zfj and Zrj on the front and rear surfaces, respectively, of the lens at the jth point (Xj, Yj) of the two-dimensional bevel bottom figure are calculated. Also, an edge thickness ETj of the lens at the point (Xj, Yj) is calculated according to the following equation (3):

$$ETj = |Zfj - Zrj| \quad (3)$$

This calculation is performed for j=1 through to j=N, to thereby obtain a three-dimensional shape of the front bottom of the bevel, (Xfn, Yfn, Zfn) (n=1, 2, . . . , N), three-dimensional shape of the rear bottom of the bevel, (Xrn, Yrn, Zrn) (n=1, 2, . . . , N), and edge thickness Etn (n=1, 2, . . . , N) of the lens corresponding to the coordinates (Xn, Yn) (n=1, 2, . . . , N) of the two-dimensional bevel bottom figure.

Here, Xfn and Xrn correspond to Xn, and Yfn and Yrn correspond to Yn.

In the following, the three-dimensional shapes of the front and rear bottoms of the bevel and the edge thickness of the lens will be collectively called three-dimensional bevel bottom figure.

Subsequently, one of Steps S35 to S37, S41 and S42 is executed in accordance with the beveling mode set in Step S3.

[S35] In accordance with the specified beveling mode (i.e., the front curve tracing mode), a Z-axis coordinate Zaj of the bevel vertex corresponding to the jth coordinates (Xj, Yj) of the two-dimensional bevel bottom figure (Xn, Yn) (n=1, 2, . . . , N) is determined based on the value of the edge thickness ETj, using equations (4) and (5) given below.

Here, the distance between the front edge of the lens and the front bottom of the bevel is called the forward shift amount FOV, and the distance between the front and rear bottoms of the bevel is called the bevel width BW.

When ETj>BW+FOV, $$Zaj = Zfj - FOV - BW/2 \quad (4), \text{ and}$$

when BW+FOV≧ETj≧BW, $$Zaj = Zfj - (ETj - BW/2) \quad (5)$$

Figure 19:
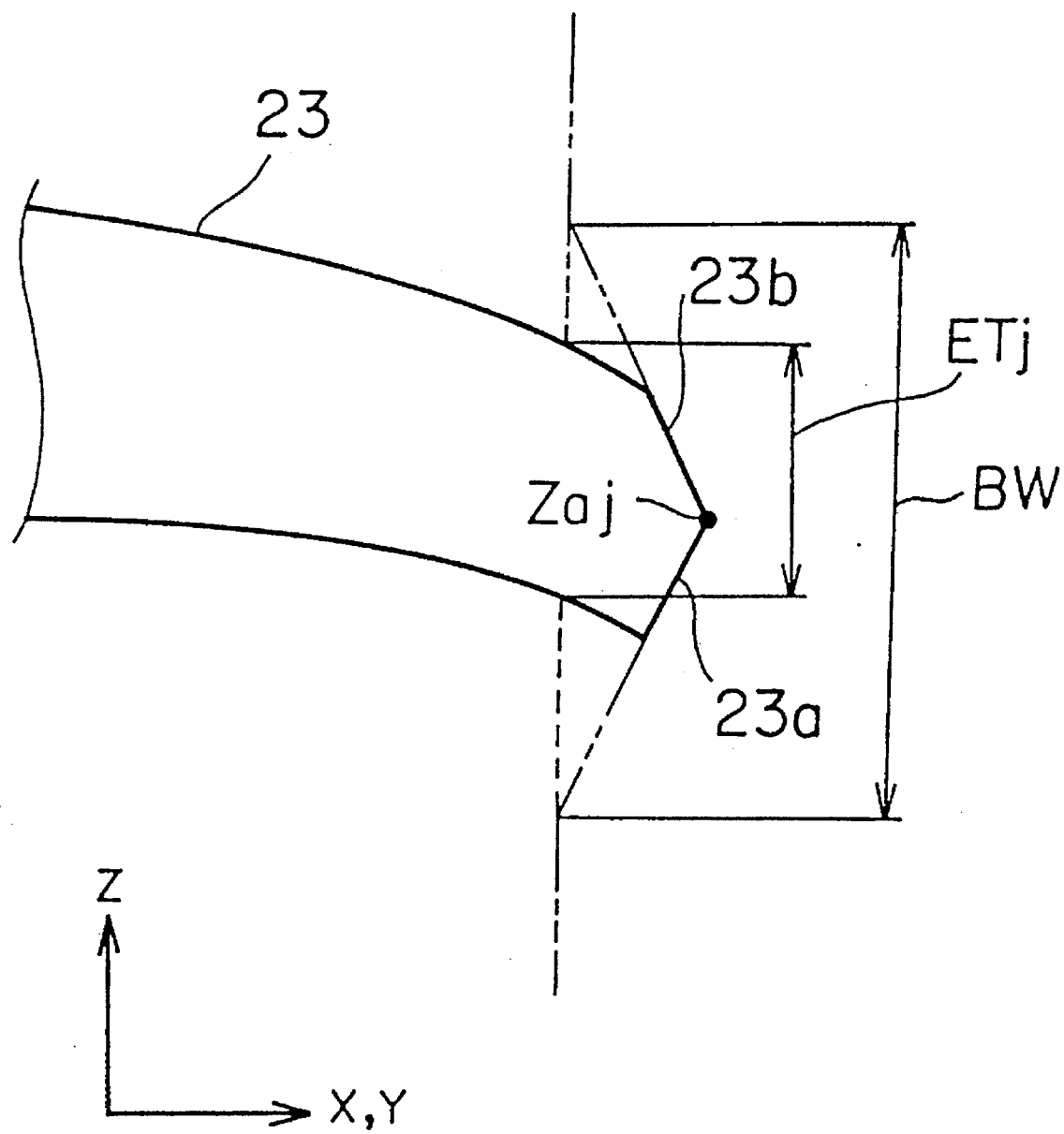
FIG. 19 is a sectional view of a lens taken along a plane containing a normal line at coordinates (Xj, Yj) and a Z axis of a processing coordinate system.

Referring to FIG. 19, the method of determining the Z-axis coordinate Zaj of the bevel vertex when ETj<BW will now be described.

FIG. 19 is a view showing a lens 23 in a section along a plane containing the normal line at coordinates (Xj, Yj) and the Z axis of the processing coordinate system. The coordinate Zaj is determined such that the lengths of two inclined planes 23a and 23b of the bevel of the lens 23 equal each other as viewed in this section.

The coordinate Zaj is obtained for j=1 through to j=N, whereby Z-axis coordinates of the bevel vertex, Zan (n=1, 2, . . . , N), corresponding to the two-dimensional bevel bottom figure (Xn, Yn) (n=1, 2, . . . , N) are determined.

[S36] In accordance with the 1:1 beveling mode, a Z-axis coordinate Zaj of the bevel vertex corresponding to the jth coordinates (Xj, Yj) of the two-dimensional bevel bottom figure (Xn, Yn) (n=1, 2, . . . , N) is determined based on the value of the edge thickness ETj, using the following equation (6):

When ETj≧BW, $$Zaj = Zfj - ETj/2 \quad (6)$$

When ETj<BW, Zaj is determined in the same manner as in the case of determining Zaj when ETj<BW in Step S35.

The coordinate Zaj is obtained for j=1 through to j=N, whereby Z-axis coordinates of the bevel vertex, Zan (n=1, 2, . . . , N), corresponding to the two-dimensional bevel bottom figure (Xn, Yn) (n=1, 2, . . . , N) are determined.

[S37] In accordance with the 1:2 beveling mode, a Z-axis coordinate Zaj of the bevel vertex corresponding to the jth coordinates (Xj, Yj) of the two-dimensional bevel bottom figure (Xn, Yn) (n=1, 2, . . . , N) is determined based on the value of the edge thickness ETj, using the following equations (7), (8) and (9):

When BW+2 (mm)≧ETj≧BW, $$Zaj = Zfj - BW/2 \quad (7),$$

when 3. BW/2 + (mm)≧ETj>BW+2 (mm), $$Zaj = Zfj - BW/2 - 1 \text{ (mm)} \quad (8), \text{ and}$$

when ETj>3.BW/2 + (mm), $$Zaj = Zfj - ETj/3 \quad (9)$$

When ETj<BW, Zaj is determined in the same manner as in the case of determining Zaj when ETj<BW in Step S35.

The coordinate Zaj is obtained for j=1 through to j=N, whereby Z-axis coordinates of the bevel vertex, Zan (n=1, 2, . . . , N), corresponding to the two-dimensional bevel bottom figure (Xn, Yn) (n=1, 2, . . . , N) are determined.

[S38] In the case of the front curve tracing mode, the Z-axis coordinate Zbn of the three-dimensional bevel edge figure (Xbn, Ybn, Zbn) (n=1, 2, . . . , N) representing the actual bevel figure does not coincide with the Z-axis coordinate of the bevel vertex, Zan (n=1, 2, . . . , N), representing a target bevel figure. Accordingly, the three-dimensional bevel edge figure is deformed such that Zbn equals Zan, without changing the circumference, and the amount of the deformation, MD, is calculated. This procedure will be described in Steps S38-1 to S38-5 below.

[S38-1] Here it is here assumed that the Y-axis coordinate Ybn of the three-dimensional bevel edge figure is a maximum when n is j1, and is a minimum when n is j2. To have Zbj1 coincide with Zaj1, first, the three-dimensional bevel edge figure is, in its entirety, displaced parallel to the Z axis, and is then rotated about an axis passing the point (Xbj1, Ybj1, Zbj1) on the three-dimensional bevel edge figure and parallel to the X axis, thereby making Zbj2 coincident with Zaj2. Subsequently, the deformation amount MD is set to an initial value of zero.

In this case, the coordinates (Xbn, Ybn) of the three-dimensional bevel edge figure may not be exactly the same as (Xan, Yan), but such a difference can be reduced to a negligible level by extracting a larger amount of data related to a sequence of points and repeating the rotation by small degrees, taking into account the angle and distance in relation to the deformation.

Figure 20:
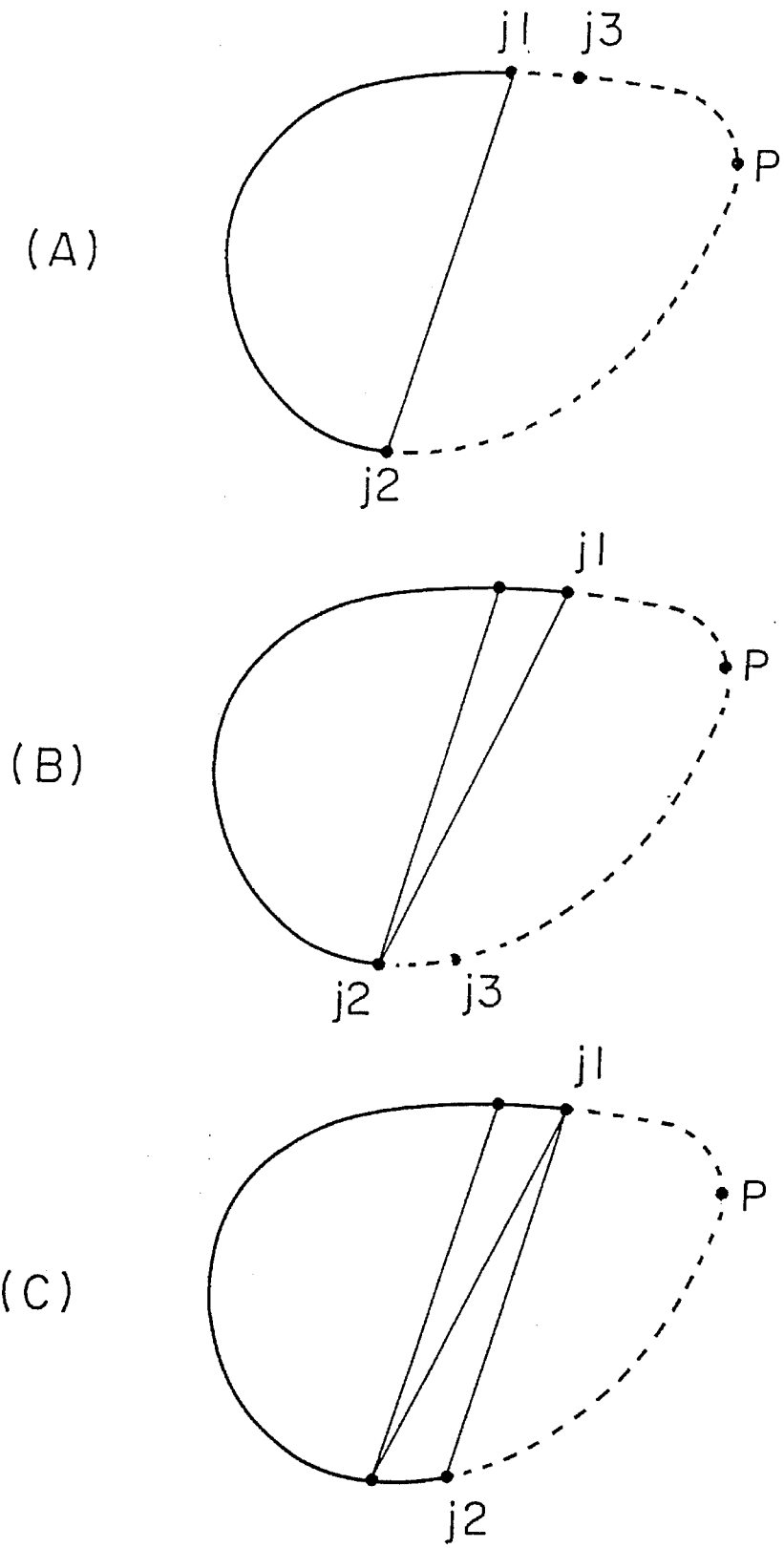
FIGS. 20(A), (B) and (C) are plan views where (A) shows a three-dimensional figure of a bevel edge projected onto the XY plane, observed in a first stage of a former half of a deformation process; (B) is a plan view showing a three-dimensional figure of the bevel edge projected onto the XY plane, observed in a second stage of the former half of the deformation process; and (C) is a plan view showing a three-dimensional figure of the bevel edge projected onto the XY plane, observed in a third stage of the former half of the deformation process.

[S38-2] This step and the next step S38-3 will be explained with reference to FIG. 20. FIG. 20 shows plan views of three-dimensional bevel edge figures projected onto the XY plane.

First, a point adjacent to the point (Xbj1, Ybj1, Zbj1) in the clockwise direction in the figure is set as a point j3 (n=j3), and a part of the three-dimensional bevel edge figure (Xbn, Ybn, Zbn) (n= 1, 2, . . . , N) is deformed by being rotated about a straight line passing the point (Xbj1, Ybj1, Zbj1) and the point (Xbj2, Ybj2, Zbj2) so that Zbj3 coincides with Zaj3 (FIG. 20(A)). The absolute value of the angle rotated is added to the deformation amount MD. The part deformed in this case is that part of the three-dimensional bevel edge figure which extends from the point n=j1 to the point n=j2 in the clockwise direction. In the case where the part deformed includes a nose-side point P which is on the bevel edge figure and is closest to the nose (as in the example of FIG. 20), the nose-width unit vector BV, defined in Step S32, is also rotated to obtain a new, transformed vector.

After the deformation, the point j3 (n=j3) is set as the point j1 (FIG. 20(B)). In FIG. 20, the bevel edge figure after the deformation process is indicated by the solid line, and the bevel edge figure before the deformation is indicated by the dashed line (this is the case with FIG. 22).

The aforesaid angle of rotation will be explained with reference to FIG. 21. In the figure, the angle of rotation corresponds to an angle md, where a point j3 represents a bevel position along the frame rim, a point p1 represents a set bevel position (target position), and a point p2 represents a final bevel position.

[S38-3] Then, a point adjacent to the point (Xbj2, Ybj2, Zbj2) in the counterclockwise direction in the figure is set as a point j3 (n=j3), and a part of the three-dimensional bevel edge figure (Xbn, Ybn, Zbn) (n=1, 2, . . . , N) is deformed by being rotated about a straight line passing the point (Xbj1, Ybj1, Zbj1) and the point (Xbj2, Ybj2, Zbj2) so that Zbj3 coincides with Zaj3 (FIG. 20(B)). The absolute value of the angle rotated is added to the deformation amount MD. The part deformed in this case is that part of the three-dimensional bevel edge figure which extends from the point j1 to the point j2 in the clockwise direction. In the case where the part that is deformed includes the nose-side point P which is on the bevel edge figure and is closest to the nose, the nose-width unit vector BV is again rotated to obtain a new, transformed vector.

After the deformation, the point j3 (n=j3) is set as the point j2 (FIG. 20(C)).

Steps S38-2 and S38-3 are alternately repeated, and when the point j3 coincides with the point j2 or the point j3 coincides with the point j1, the points j1 and j2 are reset to the respective points defined in Step S38-1, and the subsequent Step S38-4 is executed.

[S38-4] This step and the next step S38-5 will be explained with reference to FIG. 22. FIG. 22 shows plan views of three-dimensional bevel edge figures projected onto the XY plane.

First, a point adjacent to the point (Xbj1, Ybj1, Zbj1) in the counterclockwise direction in the figure is set as a point j3 (n=j3), and a part of the three-dimensional bevel edge figure (Xbn, Ybn, Zbn) (n=1, 2, . . . , N) is deformed by being rotated about a straight line passing the point (Xbj1, Ybj1, Zbj1) and the point (Xbj2, Ybj2, Zbj2) so that Zbj3 coincides with Zaj3 (FIG. 22(A)). The absolute value of the angle rotated is added to the deformation amount MD. The part deformed in this case is that part of the three-dimensional bevel edge figure which extends from the point j1 to the point j2 in the counterclockwise direction. In the case where the part deformed includes the nose-side point P which is on the bevel edge figure and is closest to the nose (unlike the example of FIG. 22), the nose-width unit vector BV, defined in Step S32, is also rotated to obtain a new, transformed vector.

After the deformation, the point j3 is set as the point j1 (FIG. 22(B)).

[S38-5] Then, a point adjacent to the point (Xbj2, Ybj2, Zbj2) in the clockwise direction in the figure is set as a point j3 (n=j3), and a part of the three-dimensional bevel edge figure (Xbn, Ybn, Zbn) (n=1, 2, . . . , N) is deformed by being rotated about a straight line passing the point (Xbj1, Ybj1, Zbj1) and the point (Xbj2, Ybj2, Zbj2) so that Zbj3 coincides with Zaj3 (FIG. 22(B)). The absolute value of the angle rotated is added to the deformation amount MD. The deformed part in this case is that part of the three-dimensional bevel edge figure which extends from the point j1 to the point j2 in the counterclockwise direction. In the case where the deformed part includes the nose-side point P which is on the bevel edge figure and is closest to the nose, the nose-width unit vector BV is again rotated to obtain a new, transformed vector.

After the deformation, the point j3 is set as the point j2 (FIG. 22(C)).

Steps S38-4 and S38-5 are alternately repeated, and when the point j3 coincides with the point j2 or with the point j1, the execution of Steps S38-4 and S38-5 is ended.

Consequently, the Z-axis coordinate Zbn of the three-dimensional bevel edge figure (Xbn, Ybn, Zbn) (n=1, 2, . . . , N) representing the actual bevel figure can be made coincident with the Z-axis coordinate of the bevel vertex, Zan (n=1, 2, . . . , N), representing the target bevel figure, without changing the circumference.

Instead of the above method, other methods such as one based on geometrical procedure may be used for carrying out the deformation without changing the circumference.

The deformation amount MD representing the degree of deformation also need be corrected. The method for the correction will now be described with reference to FIG. 23.

Figure 23:
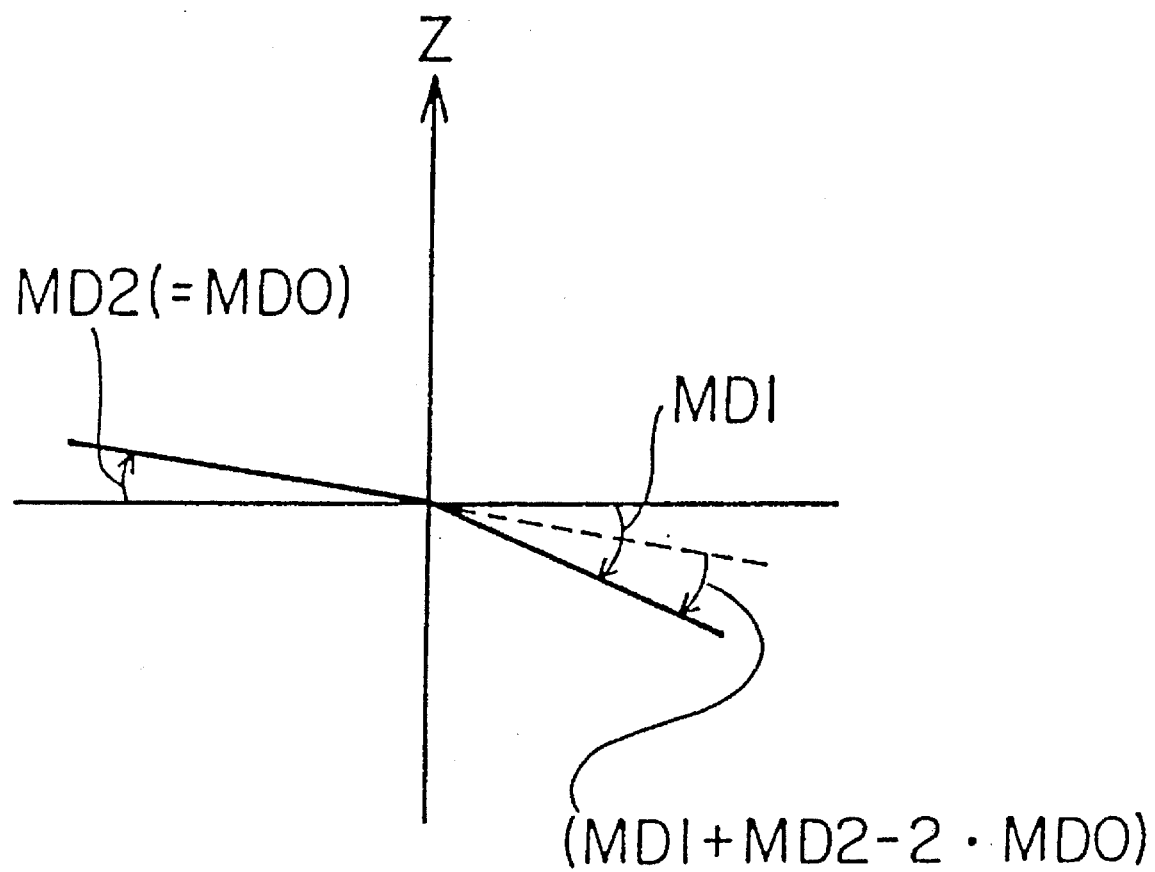
FIG. 23 is a sectional view showing the three-dimensional figure of the bevel edge taken along a plane perpendicular to a straight line passing a point (Xbj1, Ybj1, Zbj1) and a point (Xbj2, Ybj2, Zbj2)

FIG. 23 shows the three-dimensional bevel edge figure in section along a plane perpendicular to a straight line passing the point (Xbj1, Ybj1, Zbj1) and the point (Xbj2, Ybj2, Zbj2). Provided that, in the figure, the absolute value of the angle rotated when Step S38-2 is executed for the first time is MD1, and that the absolute value of the angle rotated when Step S38-4 is executed for the first time is MD2 (e.g., MD1>MD2=MD0), the resulting deformation amount MD is greater by a double of the value MD0 in the case where the partial rotation of the three-dimensional bevel edge figure was effected in the same direction in Steps S38-2 and S38-4 (as in the example of FIG. 23). Thus, the excess is subtracted from the deformation amount to obtain a final deformation amount MD.

In the case where Step S34 and the subsequent steps are re-executed after Step S45 (mentioned later) is executed, the sum of the deformation amount MD, obtained in the above manner, and MD0 is set as the value MD.

[S39] In the case of the 1:1 beveling mode, the Z-axis coordinate Zbn of the three-dimensional bevel edge figure (Xbn, Ybn, Zbn) (n=1, 2, ..., N) representing the actual bevel figure does not coincide with the Z-axis coordinate of the bevel vertex, Zan (n=1, 2, ..., N), representing the target bevel figure. Accordingly, the three-dimensional bevel edge figure is deformed such that Zbn equals Zan, without changing the circumference, and the amount of deformation, MD, associated with this deformation is calculated. This procedure is identical with that of Step S38, and a description thereof is omitted.

[S40] In the case of the 1:2 beveling mode, the Z-axis coordinate Zbn of the three-dimensional bevel edge figure (Xbn, Ybn, Zbn) (n=1, 2, ..., N) representing the actual bevel figure does not coincide with the Z-axis coordinate of the bevel vertex, Zan (n= 1, 2, ..., N), representing the target bevel figure. Accordingly, the three-dimensional bevel edge figure is deformed such that Zbn equals Zan, without changing the circumference, and the amount of deformation, MD, associated with this deformation is calculated. This procedure is identical with that of Step S38, and a description thereof is omitted.

[S41] Step S41, which is executed when the specified beveling mode is the frame curve tracing mode, will be described with reference to FIG. 24. FIG. 24 is a perspective view of a lens, illustrating the position of a bevel vertex.

A Z-axis coordinate Zan (n=1, 2, ..., N) of the bevel vertex is obtained following the same procedure as in Step S35 for the front curve tracing.

Then, the three-dimensional bevel edge figure (Xbn, Ybn, Zbn) (n=1, 2, ..., N) is displaced parallel to the Z axis of the processing coordinate system and is rotated about an axis passing the processing origin and perpendicular to the Z axis, such that the Z-axis coordinate of the three-dimensional bevel edge figure, Zbn (n=1, 2, ..., N), satisfies the relationship $Zbn \leq Zan$ (n=1, 2, ..., N) and at the same time the value M given by equation (10) below is a minimum. Subsequently, the Z-axis coordinate Zbn (n=1, 2, ..., N) of the thus-translated three-dimensional bevel edge figure is displaced parallel to the Z axis of the processing coordinate system and is rotated about an axis passing the processing origin and perpendicular to the Z axis, such that the Z-axis coordinate of the three-dimensional bevel edge figure, Zbn (n=1, 2, ..., N), satisfies the relationship $Zbn \leq Zan$ (n=1, 2, ..., N) and at the same time the value M given by the equation (10) is a minimum. Thus, new Z-axis coordinates Zbn (n=1, 2, ..., N) of the translated three-dimensional bevel edge figure are obtained.

$$M = \Sigma(|Zfi - Zbi|) \ (i=1 \ldots N) \quad (10)$$

In accordance with the rotation, the nose-width unit vector BV also is also rotated to obtain a new vector.

Then, based on the new Z-axis coordinates Zbn (n=1, 2, ..., N) of the translated three-dimensional bevel edge figure, it is determined whether Zbn=Zan or $Zbn \geq Zrn + BW/2$ holds true for all of the n values, i.e., 1, 2, ..., N.

If neither of the above relationships holds, an error code warning the operator that bevel formation according to the frame tracing mode is impossible is output, and the calculation is ended.

If one of the relationships holds, the newly obtained data is set as a final three-dimensional bevel edge figure (Xbn, Ybn, Zbn) (n=1, 2, ..., N) and final nose-width unit vector BV for the frame tracing mode.

Since in the frame tracing mode, the spectacle frames are not deformed, the deformation amount MD is zero when the frame tracing mode is specified as the beveling mode.

[S42] The front curve tracing is ideal for good-looking appearance of spectacles, but it often necessitates significant deformation of frames. Thus, in the auto-beveling mode, a bevel is formed at a position as close to a bevel which might be obtained by the front curve tracing as possible, within an allowable deformation range of the frame.

Details of Step S42 will be described with reference to FIG. 25. FIG. 25 is a perspective view of a lens which illustrates the position of a bevel vertex.

Following the same procedure as in Step S35 for the front curve tracing, Z-axis coordinates of the bevel vertex are obtained as Ztn (n=1, 2, ..., N).

Then, the three-dimensional bevel edge figure (Xbn, Ybn, Zbn) (n=1, 2, ..., N) is displaced parallel to the Z axis of the processing coordinate system and is rotated about an axis passing the processing origin and perpendicular to the Z axis, such that the Z-axis coordinate of the three-dimensional bevel edge figure, Zbn (n=1, 2, ..., N), satisfies the relationship $Zbn \leq Ztn$ (n=1, 2, ..., N) and at the same time the value M given by equation (11) below is a minimum. The thus-obtained new coordinates of the translated three-dimensional bevel edge figure are set as (Xbfn, Ybfn, Zbfn) (n=1, 2, ..., N).

$$M = \Sigma(|Zfi - Zbi|) \ (i=1 \ldots N) \quad (11)$$

Further, the same process as in Step S38 is carried out with respect to the Z-axis coordinates Zbfn of the three-dimensional bevel edge figure, using the Z-axis bevel coordinate Ztn in order to provisionally obtain final three-dimensional bevel edge figure (Xbtn, Ybtn, Zbtn) (n=1, 2, ..., N), final nose-width unit vector BVt and final deformation amount MDt that might be obtained if the front curve tracing mode is specified.

The temporary deformation amount MDt is compared with the deformation reference value MDlim which is preset for each of frame materials. If the deformation amount MDt is not greater than the reference value MDlim, the three-dimensional bevel edge figure (Xbtn, Ybtn, Zbtn) (n=1, 2, ..., N), nose-width unit vector BVt and deformation amount MDt, obtained as above, are set, respectively, as the three-dimensional bevel edge figure (Xbn, Ybn, Zbn) (n=1, 2, ..., N), nose-width unit vector BV and deformation amount MD for the auto-beveling mode, and Step S42 is ended.

If the deformation amount MDt is greater than the reference value MDlim, the jth one of Z-axis coordinates Zan (n=1, 2, ..., N) of the bevel vertex for the auto-beveling mode (i.e., the Z-axis coordinate Zaj) is determined according to the following equations (12) and (13):

When $ETj \geq BW$ and at the same time $eLMj \geq Zbfj + (Zbtj - Zbfj) \cdot MDlim/MDt$, $$Zaj = LMj \quad (12), \text{ and}$$

when $ETj \geq BW$ and at the same time $LMj < Zbfj + (Zbtj - Zbfj) \cdot MDlim/MDt$, $$Zaj = Zbfj + (Zbtj - Zbfj) \cdot MDlim/MDt \quad (13)$$

where LMj is the reference value up to which the jth coordinate Zaj can be shifted toward the rear side of the lens with respect to the three-dimensional bevel bottom figure, and is given by, e.g., the following equation:

$$LMj = Zfj - ETj/2 \quad (14).$$

Figure 26:
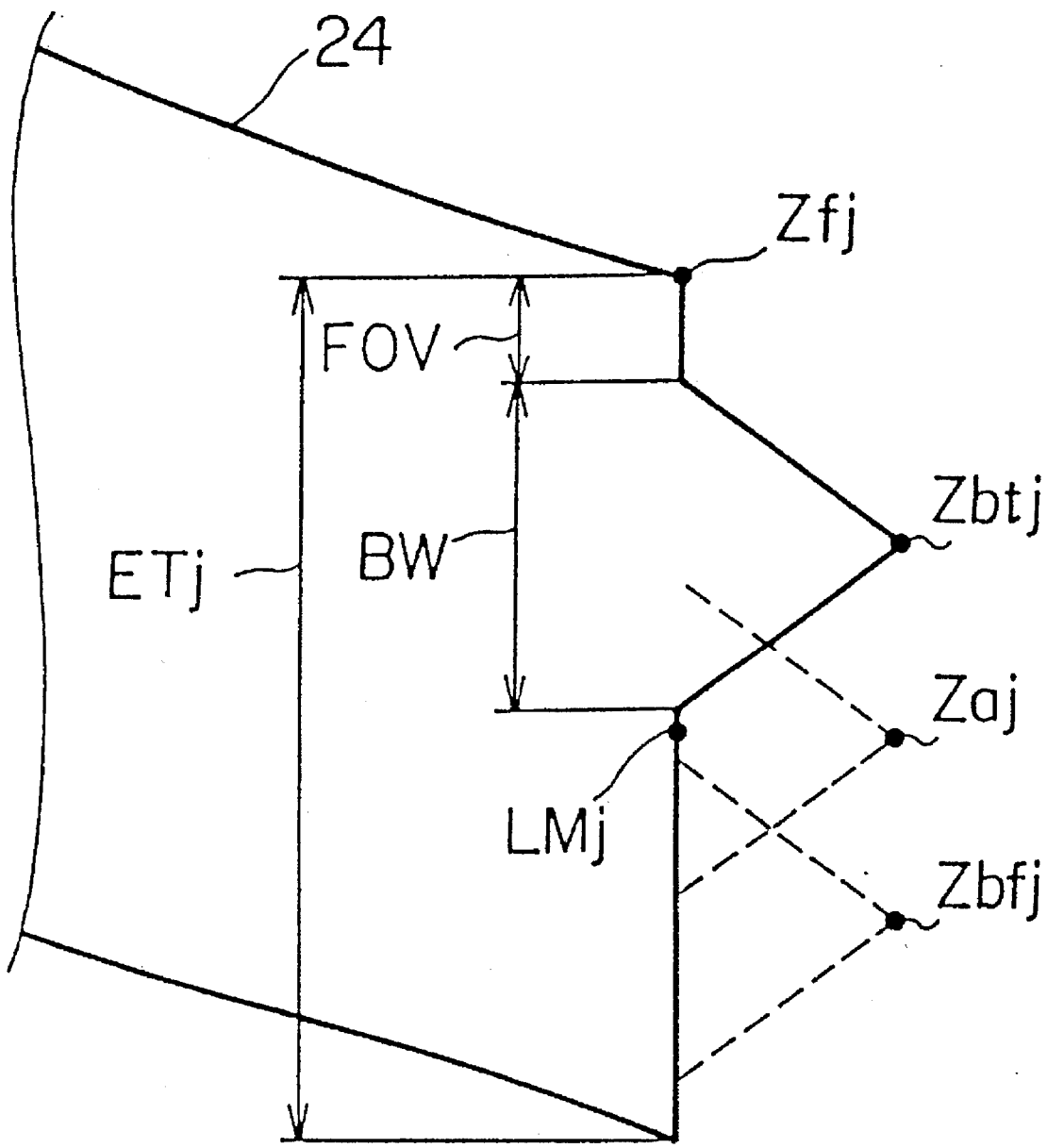
FIG. 26 is a sectional view of a lens taken along a plane containing a normal line at coordinates (Xj, Yj) and the Z axis of the processing coordinate system.

FIG. 26 is a view showing a lens 24 in section along a plane containing the normal line at coordinates (Xj, Yj) and the Z axis of the processing coordinate system, and illustrates the variables in the equations (12), (13) and (14) in relation to various parts of the lens.

When ETj<BW, Zaj is obtained in the same manner as in the case of determining Zaj when ETj<BW in Step S35.

The coordinate Zaj is obtained for j=1 through to j=N, whereby Z-axis coordinates of the bevel vertex, Zan (n=1, 2, ..., N), for the auto-beveling mode are determined.

Using the Z-axis coordinates Zan (n=1, 2, ..., N) of the bevel vertex thus determined, a process identical to that of Step S38 is executed to obtain a three-dimensional bevel edge figure (Xbn, Ybn, Zbn) (n=1, 2, ..., N), nose-width unit vector BV and deformation amount MD for the auto-beveling mode.

[S43] The deformation amount MD calculated according to the specified beveling mode is compared with the deformation reference value MDlim. If the deformation amount MD is greater than the reference value MDlim, an error code indicating that the deformation reference value is exceeded is output, and the execution of the program is ended. If the deformation reference value is not exceeded, the program proceeds to Step S44.

[S44] After the deformation of the three-dimensional bevel edge figure is completed, the position of the eyepoint, which is already calculated in Step S32 before the deformation, is again calculated to obtain an eyepoint after the deformation, and an error between the previously specified eyepoint and the eyepoint after the deformation is corrected. This step will now be explained with reference to FIG. 27.

Figure 27:
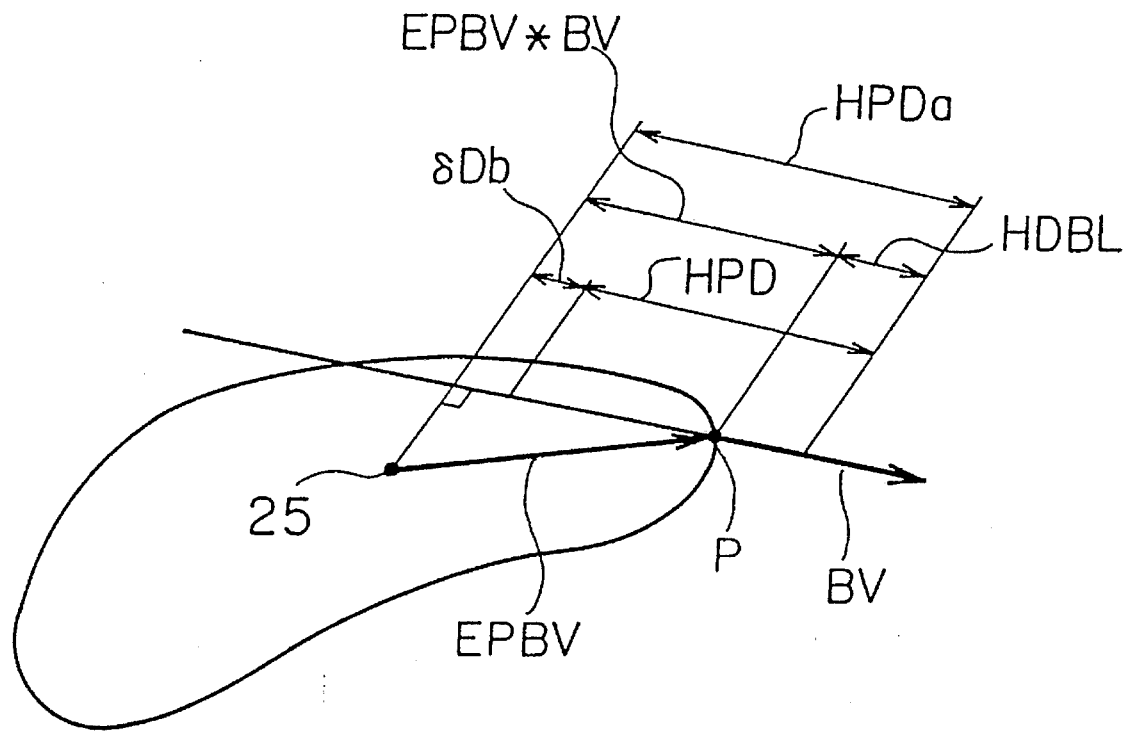
FIG. 27 is a perspective view showing a three-dimensional figure of a half-eye bevel edge in relation to an eyepoint etc.

FIG. 27 is a perspective view of a half-eye lens, illustrating a three-dimensional bevel edge figure, eyepoint, etc. Given a vector EPBV which is directed from the eyepoint 25 specified by Step S32 after the deformation to the nose-side point P of the three-dimensional bevel edge figure, as shown in the figure, a half-eye PD HPDa (i.e., the horizontal distance between the center of the nose of the spectacle wearer and the center of the pupil) after completion of the deformation of the three-dimensional bevel edge figure can be calculated from the nose-width unit vector BV and HDBL which is half the inter-rim distance, using the following equation (15):

$$HPDa = EPBV*BV + HDBL \qquad (15)$$

where symbol "*" indicates that the inner product of the vectors is obtained. This applies to the following description.

Thus, an error (δDb between HPDa and the specified half-eye PD, HPD, is calculated according to the following equation (16):

$$\delta Db = EPBV*BV + HDBL - HPD \qquad (16)$$

Accordingly, provided that the nose-width unit vector BV has components ($X_{BV}$, $Y_{BV}$, $Z_{BV}$), a three-dimensional bevel edge figure (Xcn, Ycn, Zcn) n=1, 2, ..., N) after the correction of error of the three-dimensional bevel edge figure (Xbn, Ybn, Zbn) can be obtained by the following equations (17), (18) and (19):

$$Xcn = Xbn - X_{BV} \cdot \delta Db \qquad (17)$$

$$Ycn = Ybn - Y_{BV} \cdot \delta Db \qquad (18)$$

$$Zcn = Zbn - Z_{BV} \cdot \delta Db \qquad (19)$$

Then, the corrected three-dimensional bevel edge figure (Xcn, Ycn, Zcn) (n=1, 2, ..., N) is set as (Xbn, Ybn, Zbn) (n=1, 2, ..., N).

Alternatively, an eyepoint height (i.e., the vertical distance between the datum line and the center of the wearer's pupil) EPHTa after completion of the deformation of the three-dimensional bevel edge figure may be obtained to correct an error between the obtained eyepoint height and the specified eyepoint height EPHT. This will now be explained with reference to FIG. 28.

Figure 28:
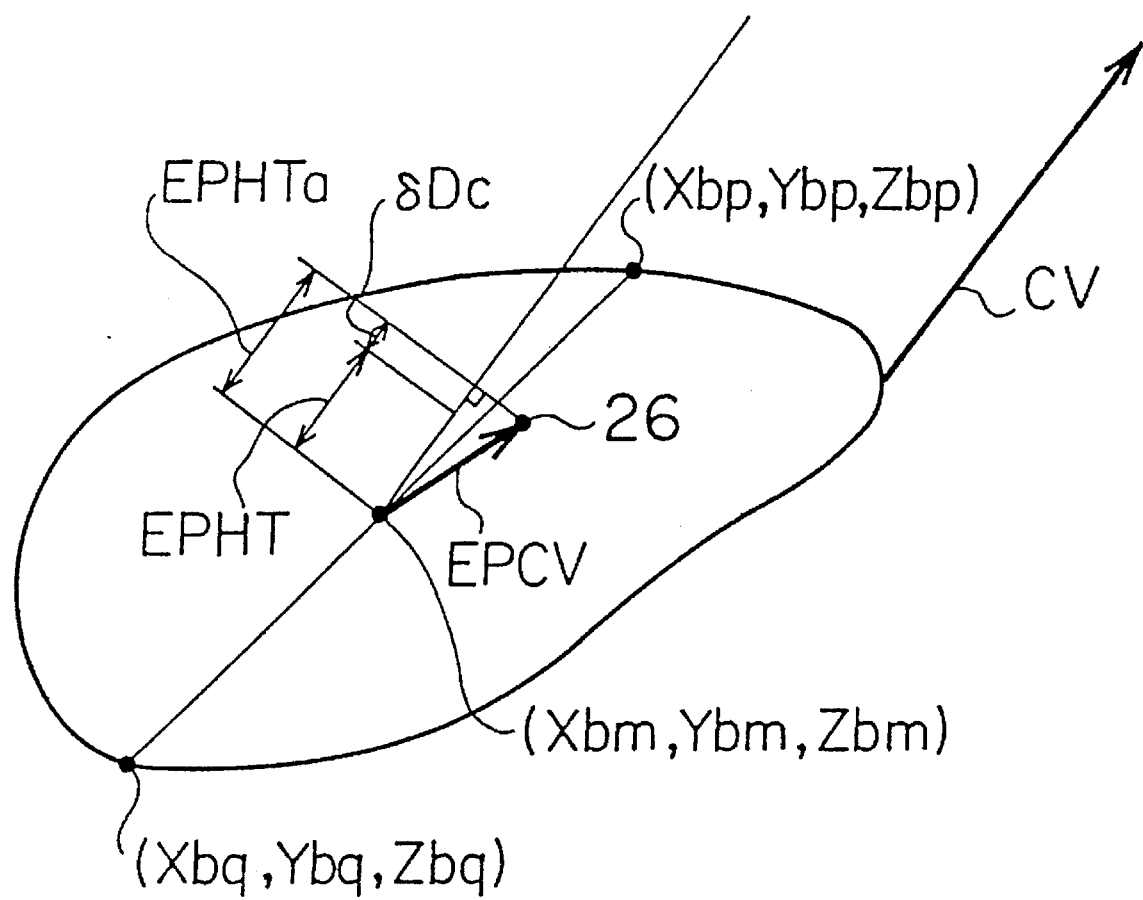
FIG. 28 is a perspective view showing a three-dimensional figure of a half-eye bevel edge in relation to the eyepoint etc.

FIG. 28 is a perspective view of a half-eye lens, illustrating a three-dimensional bevel edge figure, eyepoint, etc. First, a unit vector CV in the direction of the Y axis of the frame coordinate system is previously calculated in Step S32, and in the steps following Step S32, the Y-axis unit vector CV is transformed in the same manner as in the case of the nose-width unit vector BV.

After the deformation of the three-dimensional bevel edge figure is completed, the inner product of the Y-axis unit vector CV of the frame coordinate system and each of the coordinates (Xbn, Ybn, Zbn) (n=1, 2, ..., N) is obtained. The point at which the inner product is a maximum is set as (Xbp, Ybp, Zbp) and the point at which the inner product is a minimum is set as (Xbq, Ybq, Zbq). Then, the middle point (Xbm, Ybm, Zbm) of these two points is obtained by the following equations (20), (21) and (22):

$$Xbm = (Xbp + Xbq)/2 \qquad (20)$$

$$Ybm = (Ybp + Ybq)/2 \qquad (21)$$

$$Zbm = (Zbp + Zbq)/2 \qquad (22)$$

The middle point (Xbm, Ybm, Zbm) can be a point on the datum line of the deformed three-dimensional bevel edge figure. Thus, using a vector EPCV directed from the middle point to the eyepoint 26 on the front surface of the lens, an eyepoint height EPHTa after completion of the deformation can be calculated by the following equation (23):

$$EPHTa = EPCV*CV \qquad (23)$$

Thus, an error δDc between EPHTa and EPHT is given by the following equation (24):

$$\delta Dc = EPCV*CV - EPHT \qquad (24)$$

Accordingly, provided that the Y-axis unit vector CV of the frame coordinate system has components ($X_{CV}$, $Y_{CV}$, $Z_{CV}$), a three-dimensional bevel edge figure (Xdn, Ydn, Zdn) (n=1, 2, ..., N) after the correction of error of the three-dimensional bevel edge figure (Xbn, Ybn, Zbn) can be obtained by the following equations (25), (26) and (27):

$$Xdn = Xbn + X_{CV} \cdot \delta Dc \qquad (25)$$

$$Ydn = Ybn + Y_{CV} \cdot \delta Dc \qquad (26)$$

$$Zdn = Zbn + Z_{CV} \cdot \delta Dc \qquad (27)$$

Then, the corrected three-dimensional bevel edge figure (Xdn, Ydn, Zdn) (n=1, 2, ..., N) is set as (Xbn, Ybn, Zbn) (n=1, 2, ..., N).

[S45] It is determined whether the absolute value of the error δDb or δDc, calculated in Step S44, is greater than 0.1 mm. If the error is greater than 0.1 mm, the present deformation amount MD is stored as MD0, and Steps S34 through S44 are repeatedly executed until the absolute value of the error δDb or δDc becomes smaller than or equal to 0.1 mm, to thereby obtain a final three-dimensional bevel edge figure (Xbn, Ybn, Zbn) (n=1, 2, ..., N). When the absolute value of the error . Db or . Dc has become smaller than or equal to 0.1 mm, the program proceeds to Step S46.

[S46] Using the final three-dimensional bevel edge figure (Xbn, Ybn, Zbn) (n=1, 2, ..., N) thus obtained, a process identical with that in Step S34 is executed to obtain final three-dimensional figures of the front and rear bottoms of the bevel, i.e., $(Xfj, Yfj, Zfn)$ $(n=1, 2, \ldots, N)$ and $(Xrj, Yrj, Zrn)$ $(n=1, 2, \ldots, N)$, and a final edge thickness $ETn$ $(n=1, 2, \ldots, N)$ of the lens.

Where the jth point of the bevel bottom figure fulfills the relationship $ETj<BW$, the following steps are taken: In the section of the lens along a plane containing the jth coordinates $(Xj, Yj)$ of the two-dimensional bevel bottom figure $(Xn, Yn)$ $(n=1, 2, \ldots, N)$ and parallel to the normal line at $(Xj, Yj)$ and the Z axis of the processing coordinate system, a point at which the front inclined surface (corresponding to 23b in FIG. 19) of the lens, determined by the three-dimensional bevel edge figure, crosses the front surface of the lens, and a point at which the rear inclined surface (corresponding to 23a in FIG. 19) of the lens crosses the rear surface of the lens, are set as $(Xfj, Yfj, Zfj)$ and $(Xrj, Yrj, Zrj)$, respectively.

Now, Step S22 in FIG. 4 will be described again in detail.

First, a calculation similar to the bevel process/design calculation in Step S12 of FIG. 3 is performed. In an actual lens processing, however, when the lens is blocked (held), there may occur an error between the calculated lens position and an actual lens position, depending on the lens type. Such an error is corrected after Step S33 in FIG. 14 is executed.

Specifically, in order to acquire an actual position of the lens mounted to the lens grinding machine 241, the measured position data representing at least three points on the front or rear surface of the lens, previously measured in Step S21, is set as $(Xsm, Ysm, Zsm)$ $(m=1, 2, \ldots, M)$; and the calculated position of the front or rear surface of the lens corresponding to the measured position data is set as $(Xsm, Ysm, Ztm)$ $(m=1, 2, \ldots, M)$. A summation $DZ$ of errors in the Z-axis direction is obtained by the following equation (28):

$$DZ=\Sigma(|Zsi-Zti|) \ (i=1 \ldots M) \quad (28)$$

Then, the calculated three-dimensional frame shape data, lens position data, and nose-width vector BV, defined with reference to the processing coordinate system, are rotated about a straight line passing the processing origin and translated parallel to the Z axis, such that the value DZ becomes a minimum.

After the error between the calculated lens position and the actual lens position is minimized in this manner, Step S34 and the subsequent steps (FIG. 14) are executed to obtain the final three-dimensional bevel edge figure $(Xbn, Ybn, Zbn)$ $(n=1, 2, \ldots, N)$.

Then, based on the final three-dimensional bevel edge figure $(Xbn, Ybn, Zbn)$ $(n=1, 2, \ldots, N)$ thus obtained, a three-dimensional processing path $(Xgn, Ygn, Zgn)$ $(n=1, 2, \ldots, N)$ with reference to the processing coordinate system, along the lens which is to be processed with the grindstone 29 (cf. FIG. 29) having a radius TR, is calculated. The calculation method will now be explained with reference to FIG. 29.

Figure 29:
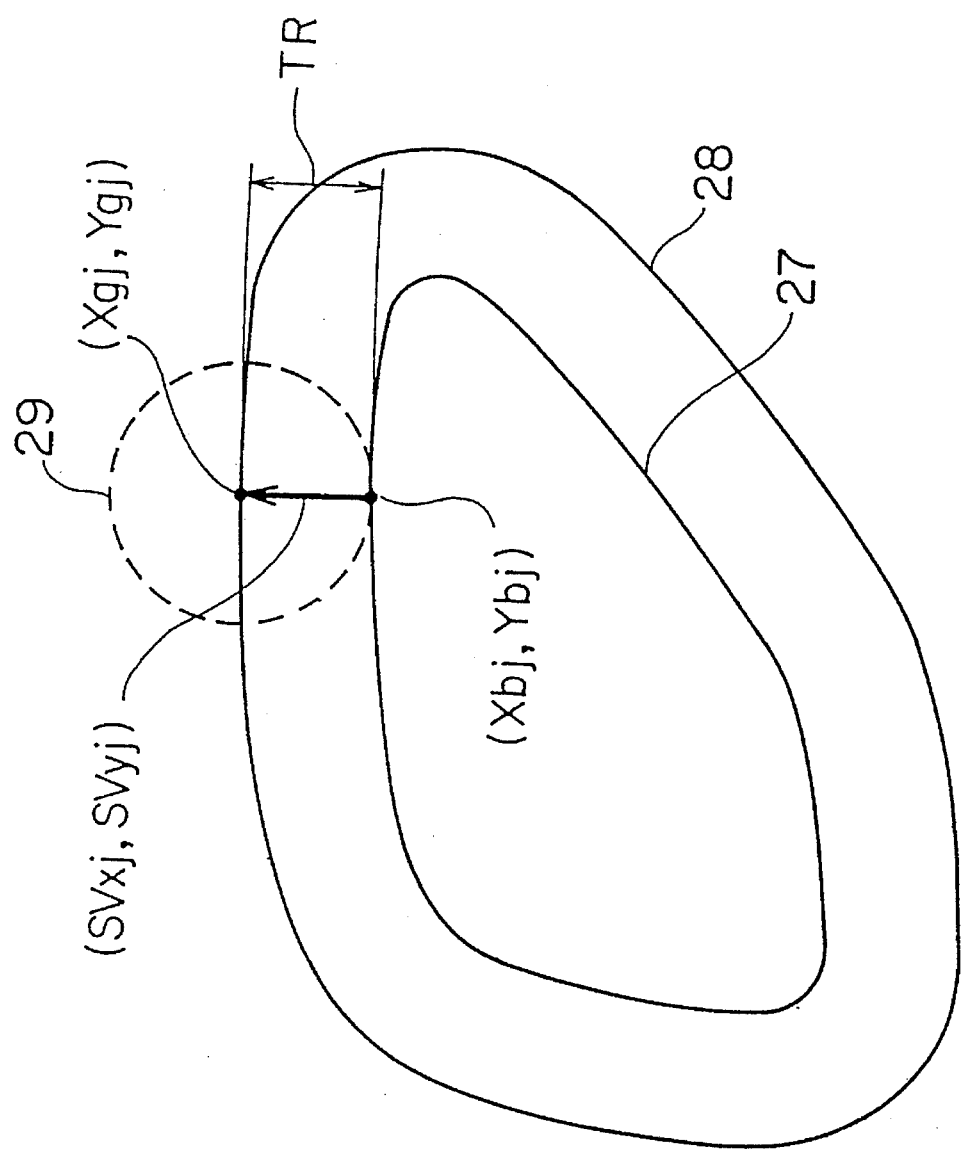
FIG. 29 is a plan view showing a bevel edge and a processing path projected onto the XY plane.

FIG. 29 is a plan view showing the bevel edge figure and the processing path projected onto the XY plane. First, a two-dimensional processing path 28 is obtained from a two-dimensional bevel edge FIG. 27, which is obtained by projecting the three-dimensional bevel edge figure $(Xbn, Ybn, Zbn)$ $(n=1, 2, \ldots, N)$ onto the XY plane of the processing coordinate system.

Namely, provided that the coordinates of the two-dimensional bevel edge FIG. 27 are $(Xbn, Ybn)$ $(n=1, 2, \ldots, N)$, and that the coordinates of the two-dimensional processing path 28 are $(Xgn, Ygn)$ $(n=1, 2, \ldots, N)$, the two-dimensional processing path 28 is obtained by deforming the two-dimensional bevel edge FIG. 27 in the direction of the normal line of the shape 27 by an amount equal to the radius TR of the grindstone 29. Thus, by setting the normal vector at the jth point $(Xbj, Ybj)$ of the two-dimensional bevel edge FIG. 27 as $(SVxj, SVyj)$, corresponding coordinates $(Xgj, Ygj)$ of the two-dimensional processing path 28 can be obtained by adding $(SVxj, SVyj)$ to $(Xbj, Ybj)$. This calculation is performed for $j=1$ through to $j=N$, whereby the two-dimensional processing path $(Xgn, Ygn)$ $(n=1, 2, \ldots, N)$ is obtained.

Z-axis coordinate $Zgn$ of the three-dimensional processing path $(Xgn, Ygn, Zgn)$ $(n=1, 2, \ldots, N)$ is equal to the Z-axis coordinate $Zbn$ of the three-dimensional bevel edge figure $(Xbn, Ybn, Zbn)$ $(n=1, 2, \ldots, N)$, and thus can be easily obtained based on the relationship $Zgn=Zbn$ $(n=1, 2, \ldots, N)$.

In the case where the control coordinate system for the lens grinding machine 241 is a cylindrical coordinate system, the three-dimensional processing path $(Xgn, Ygn, Zgn)$ $(n=1, 2, \ldots, N)$ thus obtained is subjected to coordinate transformation to be transformed into a three-dimensional processing path $(Rgn, \theta gn, Zgn)$ $(n=1, 2, \ldots, N)$ based on the cylindrical coordinate system, and the obtained path is applied to the lens grinding machine 241.

As described above, in Step S31, the size of a predetermined part of the spectacle frame is calculated based on the coordinates of a reproduced three-dimensional frame shape, and the coordinates of the reproduced three-dimensional frame shape is corrected using the correction coefficient k, which is obtained from the ratio between the calculated-size of the predetermined part of the frame and actual measured values representing the size of the corresponding part in the reproduced three-dimensional frame shape. Accordingly, error of the frame shape itself, which occurs when reproducing the frame shape based on received data, is corrected, whereby the original frame shape can be accurately reproduced.

Further, as shown in Step S31, the correction coefficient CF corresponding to the material information is read, and the coordinates of the frame shape are corrected using the read correction coefficient. Consequently, expansion or contraction of the frame shape attributable to the frame material used is corrected, thus making it possible to accurately reproduce the original frame shape.

In Step S32, the coordinates of the right and left frame rim shapes are positioned with reference to the same coordinate system based on data representing the distance between the right and left frame rims, and the right and left frame rim are rotated based on data representing the inclination angle of the right and left frame rims in order to obtain a three-dimensional frame shape. The distance data does not change even if the frame shape is subject to expansion or contraction, and thus, the right and left frame rim shapes can be accurately positioned with reference to the same coordinate system.

In Steps S38 to S40, the frame shape is deformed such that the Z-axis component of the frame shape coincides with the Z-axis component of the set bevel, without changing the circumference of the frame. Consequently, the circumference of the bevel vertex of the lens coincides with the circumference of the bottom of the bevel groove in the frame, whereby beveled lenses can be closely fitted in the frame.

Further, in Steps S38 to S40, the frame shape is deformed by rotation about a straight line passing two points on the frame shape, of which the Z-axis components coincide with those of the corresponding positions of the set bevel, such that the Z-axis component of a point on the frame shape close to one of the two points coincides with the Z-axis component of the corresponding point of the set bevel. This deformation method permits a deformation of the frame shape without causing a change in the circumference of the bottom of the bevel groove in the frame.

Furthermore, after the frame shape is deformed in Steps S38 to S40 such that the in Z-axis component of the frame shape coincides with the Z-axis component of the set bevel, without changing the circumference of the frame rim, an error between the eyepoint of the deformed frame shape and the previously specified eyepoint is obtained in Step S44, in order to correct the eyepoint on the deformed frame shape. Consequently, the circumference of the bevel vertex of the lens coincides with the circumference of the bottom of the bevel groove in the frame, whereby beveled lenses can be closely fitted in the frame. Moreover, error between the eyepoint of the spectacle lens and the previously specified eyepoint, which results from the frame shape deformation, can be eliminated.

The aforementioned steps are repeated until the error becomes smaller than or equal to the predetermined value (as shown in Step S45). As a result, the finally obtained frame shape, and the bevel figure set based on the final frame shape are such that the circumference of the bevel vertex of the lens coincides with the circumference of the bottom of the bevel groove in the frame. Thus, beveled lenses can be closely fitted in the frame, and error between the eyepoint of the lens and the previously specified eyepoint has been corrected.

In Step S43, an amount of deformation of the frame shape, which arises when the frame shape is deformed to match with the set bevel, is calculated, and the calculated deformation amount is compared with the predetermined reference value to determine whether the deformation of the frame shape is possible or not, which result is reflected in the bevel setting. This permits the bevel position to be suitably changed, and thus the bevel can be set such that beveled lenses can be closely fitted in the frame.

In this case, the predetermined reference value is set according to the frame material used, as discussed with reference to Step S42. Generally, different frame materials have different allowable deformation ranges, but such difference in the allowable range can be appropriately dealt with, thus permitting a bevel setting such that beveled lenses can be reliably fitted in a variety of spectacle frames.

Further, in Step S42, the frame rim shape is deformed without changing the circumference thereof, such that the Z-axis component of the rim shape coincides with the Z-axis component of the first bevel figure shifted by a specified distance from the front edge of the lens, the amount of the deformation is calculated, and if the calculated deformation amount is not greater than the predetermined reference value, a bevel of the first bevel figure is set with respect to the edge surface of the lens. Thus, with the circumference of the bevel edge of the lens being kept identical to the circumference of the bottom of the bevel groove in the frame, the frame shape is deformed, and the deformation of the frame is effected within the allowable range, whereby the bevel position can be set along the front edge of the lens.

Furthermore, as mentioned with reference to Step S42, if the calculated deformation amount is greater than or equal to the predetermined reference value, a second bevel figure is calculated based on the ratio of the predetermined reference value to the calculated deformation amount, and a bevel with the second bevel figure is set with respect to the edge surface of the lens. Consequently, the frame is deformed within the allowable deformation range, and the bevel position can be set at a position as close to the front edge of the lens as possible.

In Steps S6 and S9 of FIG. 2, at least the circumference of the inner peripheral groove of the frame is calculated, and the calculated circumference is transmitted to the lens processor side. Namely, the circumference data is transmitted, in addition to ordinary data including two-dimensional coordinates, radius and coordinates of the center of a spherical or torical surface in cases where the frame rim is situated on the spherical or torical surface, etc. Thus, the data transmission amount is increased by an amount corresponding to the circumference data, but is by far smaller compared with the case of transmitting three-dimensional shape data itself. Also advantage of transmitting the circumference data is retained which is an important factor in making lens settings such that processed lenses can be closely fitted in the frame.

In Step S31, the processor side, to which the frame shape data is transmitted, is supplied with at least the circumference of the inner peripheral groove of the frame. Namely, the processor side is supplied with the circumference data, in addition to ordinary data including two-dimensional coordinates, radius and coordinates of the center of a spherical or torical surface in cases where the frame rim is situated on the spherical or torical surface, etc. Accordingly, even in the case of an original frame of which a portion is not situated on a spherical or torical surface, lenses that closely fit in the frame can be processed by reproducing the frame shape based on the circumference.

Further, in Step S31, at least the circumference of the inner peripheral groove of the frame is supplied, and the frame rim is deformed without changing the circumference corresponding to the received circumference such that the frame is matched with the bevel which is set at a predetermined position of the lens. Namely, in the case of a frame with a shape which can be altered, the frame is deformed without changing the circumference corresponding to the received circumference so as to match a predetermined bevel. Accordingly, an ideal bevel can be formed, and even when the frame is deformed, lenses can be closely fitted in the deformed frame.

The present invention can be applied to making a groove in the edge of a lens to obtain rimless spectacles.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A spectacle lens supply method for a system which includes a terminal installed at a lens orderer side and a computing device installed at a lens processor side and connected to the terminal through a communication line, for supplying spectacle lenses, said spectacle lens supply method comprising:

a first step of transmitting processing condition data, which includes at least one of lens information, frame information, prescription values, layout information and processing information, from the terminal to the computing device;

a second step of calculating a desired lens shape including a bevel figure by the computing device in accordance with the processing condition data transmitted thereto;

a third step of creating accept/reject information as to whether a lens process including a beveling is possible or not, by the computing device in accordance with the result of the calculation, and transmitting the accept/reject information to the terminal; and a fourth step of displaying the transmitted accept/reject information at the terminal to permit the orderer side to learn whether the lens process including the beveling is possible or not.

2. A spectacle lens supply method according to claim 1, wherein said terminal comprises display means for displaying the accept/reject information transmitted thereto, said third step comprising transmitting the accept/reject information and a predicted shape of a beveled lens predicted based on the result of the calculation, to the terminal, and said fourth step comprising displaying the accept/reject information and the predicted shape of the beveled lens at the display means.

3. A spectacle lens supply method according to claim 1, which further comprises a fifth step subsequent to said fourth step, said fifth step comprising modifying the lens information, the frame information and/or the prescription values transmitted in said first step, based on the displayed accept/reject information, and retransmitting the modified data from the terminal.

4. A spectacle lens supply method according to claim 1, which further comprises a fifth step subsequent to said fourth step, said fifth step comprising placing an order with the lens processor side for an unedged lens by means of the terminal, based on the displayed accept/reject information.

5. A spectacle lens supply method according to claim 1 which further comprises a fifth step subsequent to said fourth step, said fifth step comprising placing an order with the lens processor side for a beveled lens by means of the terminal, based on the displayed accept/reject information.

6. A spectacle lens supply method according to claim 1, wherein said first step comprises transmitting the processing condition data of a spectacle lens from the terminal to the computing device; said second step comprising a step ($2a$) of calculating a shape of an edged lens based on the processing condition data, and a step ($2b$) of creating an estimated solid figure of the lens based on the calculated shape of the edged lens; said third step comprising transmitting the estimated solid figure from the computing device to the terminal; and said fourth step comprising displaying the estimated solid figure, together with auxiliary lines extending along front and rear surfaces of the lens, respectively.

7. A spectacle lens supply method according to claim 1, wherein said second step comprises a step ($2a$) of setting a bevel with respect to an edge of a spectacle lens according to a specified beveling mode, a step ($2b$) of calculating an amount of deformation of a frame shape which will be caused if the frame shape is deformed so as to be matched with the set bevel, and a step ($2c$) of comparing the calculated deformation amount with a predetermined reference value; and said third step comprising creating information as to whether deformation of the frame shape is possible or not, based on the result of the comparison, and transmitting the created information to the terminal.

8. A spectacle lens supply method according to claim 1, wherein said first step comprises a step ($1a$) of measuring a three-dimensional shape of an inner peripheral groove of a frame, a step ($1b$) of calculating at least a circumference of the inner peripheral groove of the frame based on coordinates of the measured three-dimensional shape, and a step ($1c$) of transmitting the calculated circumference to the computing device.

9. A spectacle lens supply method according to claim 1, wherein said first step comprises transmitting at least a circumference of an inner peripheral groove of a frame, said second step comprising reproducing a shape of the frame based on the transmitted circumference.

10. A spectacle lens supply method according to claim 1, wherein said first step comprises transmitting, as the frame information, two-dimensional coordinates obtained by projecting a three-dimensional shape of a frame onto a plane, parameter values defining a curved surface approximate to the three-dimensional frame shape, and an actual measured value representing the size of a predetermined part of the frame; and said second step comprises reproducing coordinates of the three-dimensional frame shape based on the frame information, calculating the size of the predetermined part of the frame based on the reproduced coordinates of the three-dimensional frame shape, obtaining a correction coefficient based on a ratio between the calculated size of the predetermined part of the frame and the actual measured value representing the size of the predetermined part of the frame, correcting the reproduced coordinates of the three-dimensional frame shape based on the correction coefficient, to correct an error associated with the reproduction of the frame shape, and setting a bevel based on the thus corrected frame shape.

11. Spectacle lens supply method according to claim 10, wherein said size of the predetermined part of the frame corresponds to a circumference of the frame.

12. A spectacle lens supply method according to claim 1, wherein said first step comprises transmitting frame material information as the frame information, said second step comprising obtaining a correction coefficient related to a frame material, and compensating for expansion or contraction of the frame attributable to the frame material by using the obtained correction coefficient.

13. A spectacle lens supply method according to claim 1, wherein said second step comprises setting a first bevel with respect to an edge of a spectacle lens according to a specified beveling mode and based on the processing condition data transmitted in said first step, deforming a frame shape without substantially changing a circumference thereof such that a Z-axis component, which is a coordinate component in the direction of a thickness of an edge of the frame shape, coincides with a Z-axis component of the set first bevel, setting the deformed frame shape as a new frame shape, and setting a second bevel based on the new frame shape.

14. A spectacle lens supply method according to claim 13, wherein said first bevel is set by obtaining a bevel bottom figure based on a two-dimensional shape of the frame, obtaining three-dimensional figures of front and rear bottoms of the bevel based on the bevel bottom figure and three-dimensional shapes of front and rear surfaces of the lens to be processed, and setting a bevel at a specified position based on the three-dimensional figures of the front and rear bottoms of the bevel.

15. A spectacle lens supply method according to claim 13, wherein said deformation of the frame shape is carried out by rotating the frame shape about a straight line passing two points on the frame shape, which two points have Z-axis components coinciding with those of corresponding positions of the set bevel, such that the Z-axis component of a point on the frame shape close to one of the two points coincides with the Z-axis component of a corresponding point of the set bevel.

16. A spectacle lens supply method according to claim 1, wherein said second step comprises:

a step (*2a*) of calculating a first bevel figure extending along an edge of a spectacle lens and situated at a specified position with respect to a front surface of the lens;

a step (*2b*) of calculating a first frame shape which is obtained by deforming a frame shape without changing a circumference thereof such that a Z-axis component, which is a coordinate component in the direction of a thickness of an edge of the frame shape, coincides with a Z-axis component of the first bevel figure;

a step (*2c*) of calculating an amount of deformation associated with the deformation of the frame shape;

a step (*2d*) of comparing the calculated deformation amount with a predetermined reference value; and a step (*2e*) of setting the first frame shape as a new frame shape when the calculated deformation amount is not greater than the predetermined reference value.

17. A spectacle lens supply method according to claim 1, wherein said second step comprises:

setting a first bevel with respect to an edge of a spectacle lens by using the processing condition data transmitted in said first step and according to a specified beveling mode;

calculating an amount of deformation of a frame shape which will be caused if the frame shape is deformed so as to be matched with the set first bevel;

comparing the calculated deformation amount with a material reference value which is predetermined according to a frame material;

determining whether deformation of the frame shape is possible or not, based on the result of the comparison;

setting the deformed frame shape as a new frame shape when the deformation amount is not greater than the material reference value; and setting a second bevel based on the new frame shape.

18. A spectacle lens supply method according to claim 17, wherein said deformation of the frame shape is carried out without changing a circumference of the frame such that a Z-axis component, which is a coordinate component in the direction of a thickness of an edge of the frame shape, coincides with a Z-axis component of the first bevel.

19. A spectacle lens supply method according to claim 1, wherein said second step comprises:

setting a first bevel with respect to an edge of a spectacle lens by using the processing condition data transmitted in said first step and according to a specified beveling mode;

deforming a frame shape without changing a circumference thereof such that a Z-axis component, which is a coordinate component in the direction of a thickness of an edge of the frame shape, coincides with a Z-axis component of the first bevel;

locating an eyepoint with respect to the deformed frame shape, the eyepoint being a point on a front surface of the lens corresponding to a pupil;

obtaining an error between the located eyepoint and an eyepoint previously specified in said first step as the processing condition data;

correcting the eyepoint of the deformed frame shape based on the obtained error; and setting a bevel of the spectacle lens by using the corrected eyepoint as the layout information specifying processing conditions.

* * * * *